(12) United States Patent  (10) Patent No.: US 9,081,445 B2
Deuel et al.  (45) Date of Patent: Jul. 14, 2015

(54) DISPLAY AND USER INTERFACE

(75) Inventors: Eric S. Deuel, Allendale, MI (US); Peter W. Mokris, Holland, MI (US); Jeffrey Golden, Holland, MI (US); Douglas C. Campbell, Northville, MI (US); Gerd Reime, Bühl (DE); Franz-Simon Haider, Farmington Hills, MI (US); Jüergen Larm, Farmington Hills, MI (US); Thomas W. Sojda, Rochester Hills, MI (US)

(73) Assignees: Johnson Controls Technology Company, Holland, MI (US); ELMOS North America Inc., Farmington Hills, MI (US)

( * ) Notice: Subject to any disclaimer, the term of this patent is extended or adjusted under 35 U.S.C. 154(b) by 1684 days.

(21) Appl. No.: 12/518,076

(22) PCT Filed: Dec. 5, 2007

(86) PCT No.: PCT/US2007/025046
§ 371 (c)(1),
(2), (4) Date: Jan. 26, 2012

(87) PCT Pub. No.: WO2008/073289
PCT Pub. Date: Jun. 19, 2008

(65) Prior Publication Data
US 2012/0326958 A1 Dec. 27, 2012

Related U.S. Application Data

(60) Provisional application No. 60/873,780, filed on Dec. 8, 2006.

(51) Int. Cl.
*G06F 3/042* (2006.01)

(52) U.S. Cl.
CPC .................................. *G06F 3/0421* (2013.01)

(58) Field of Classification Search
CPC .............................. G06F 3/042; G06F 3/0421
USPC .................................................. 345/173, 175
See application file for complete search history.

(56) References Cited

U.S. PATENT DOCUMENTS 6,181,996 B1 * 1/2001 Chou et al. ...................... 701/36
7,710,504 B2 * 5/2010 Lowe ............................ 348/734
(Continued)

FOREIGN PATENT DOCUMENTS

EP   1 288 848 A   3/2003
JP   2003-150309 A   5/2003
(Continued)

OTHER PUBLICATIONS

Office Action from related Japanese application No. 2009-540308 dated Jul. 17, 2012.
(Continued)

*Primary Examiner* — Lixi C Simpson
(74) *Attorney, Agent, or Firm* — Foley & Lardner LLP

(57) ABSTRACT

A touchless method for registering commands from a display (e.g. reconfigurable display) may include any of various components. The method may use a light sensor in front of or behind the display to detect light reflected by a user's finger approaching a control option displayed on the display. Light used to display images may be provided at a frequency and/or time that can be identified by a processor connected to the light sensor, or can possess some other unique property (e.g. color) which may be distinguished by the processor.

45 Claims, 15 Drawing Sheets

(56) References Cited

U.S. PATENT DOCUMENTS

| | | | |
|---|---|---|---|
| 8,089,455 B1* | 1/2012 | Wieder | 345/156 |
| 2002/0075386 A1* | 6/2002 | Tanaka | 348/141 |
| 2003/0222849 A1* | 12/2003 | Starkweather | 345/156 |
| 2004/0131361 A1* | 7/2004 | Bischoff | 398/116 |
| 2005/0047737 A1* | 3/2005 | Veligdan et al. | 385/120 |
| 2005/0104860 A1* | 5/2005 | McCreary et al. | 345/173 |
| 2006/0290905 A1* | 12/2006 | May | 353/122 |
| 2007/0038772 A1* | 2/2007 | Obata | 709/232 |

FOREIGN PATENT DOCUMENTS

| | | |
|---|---|---|
| JP | 2006-227907 A | 8/2006 |
| JP | 05-455639 | 1/2014 |
| WO | WO 2005/026938 A | 3/2005 |
| WO | WO-2008/073289 A3 | 6/2008 |

OTHER PUBLICATIONS

European Patent Office Communication corresponding to EP 07853272.8, dated Sep. 22, 2009, 5 pages.

Communication Pursuant to Article 94(3) EPC mailed Dec. 3, 2013, as received in corresponding European Patent Application No. 07 853 272.8.

International Search Report for corresponding PCT Application No. PCT/US2007/025046 (2 pages).

Office Action dated Jul. 15, 2014, in corresponding Japanese Application No. 2013-176801 and English translation, 5 pages.

* cited by examiner

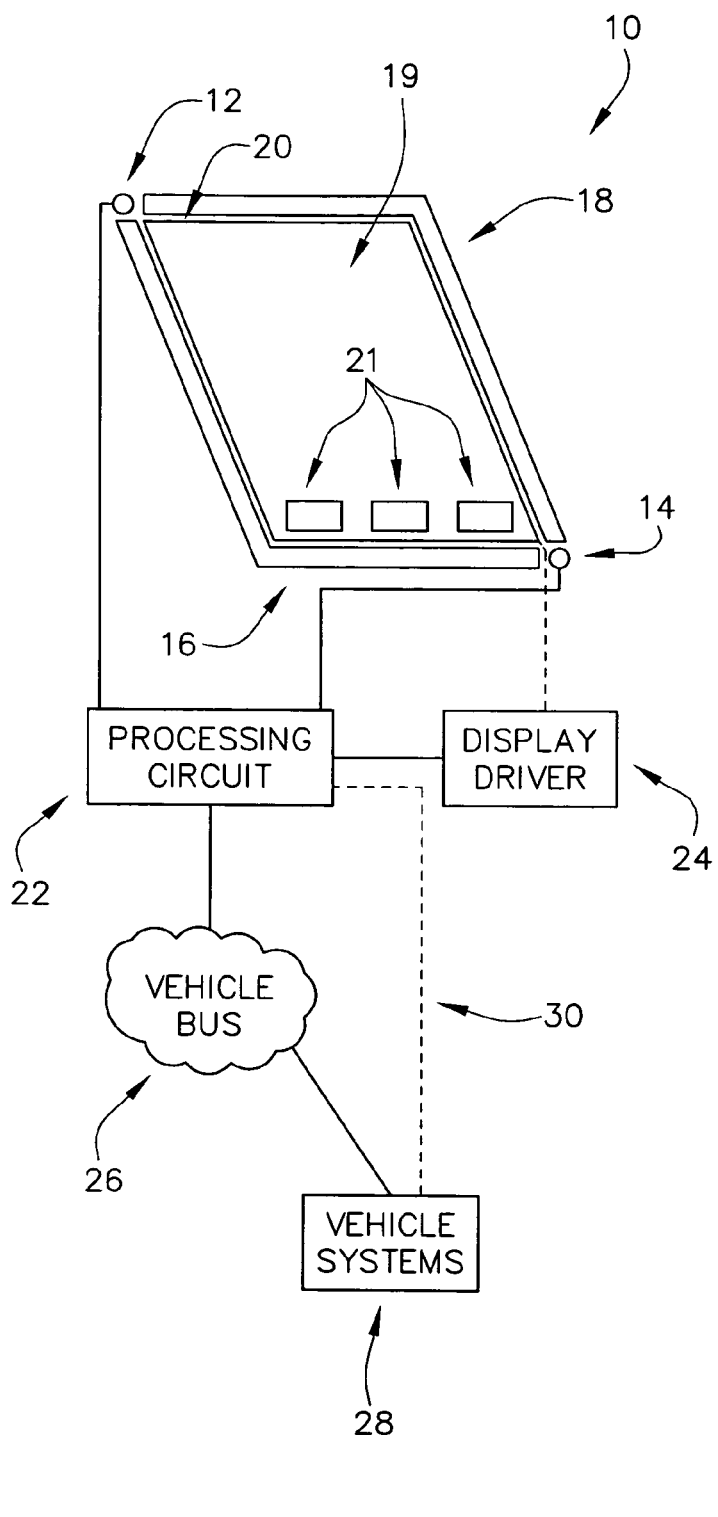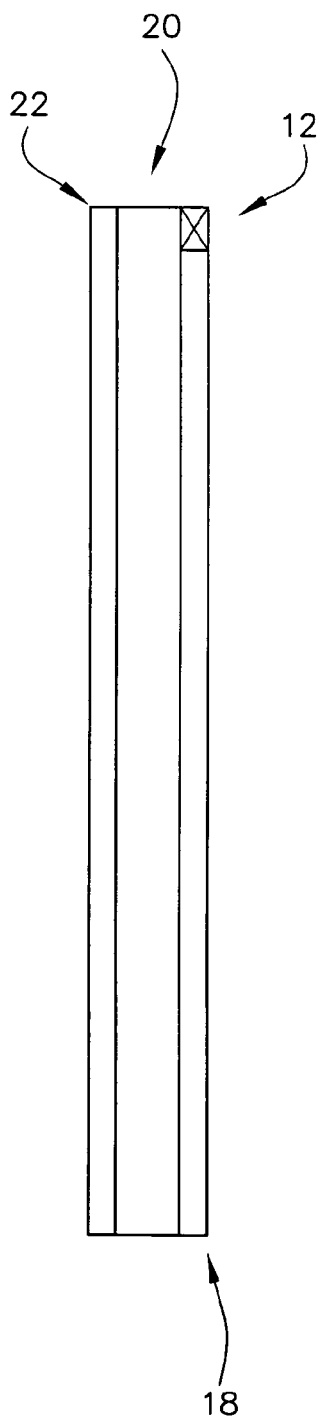

FIG. 8
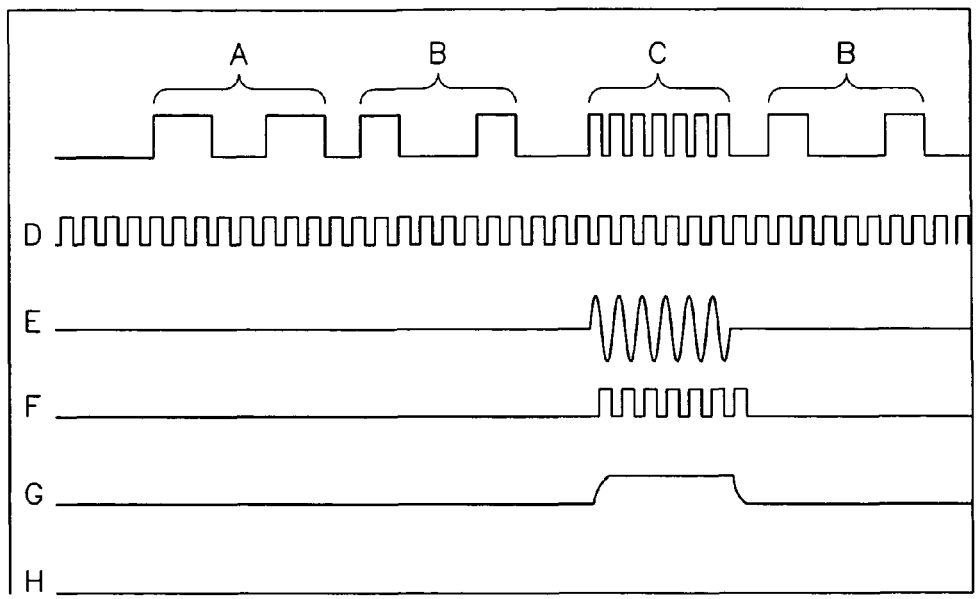
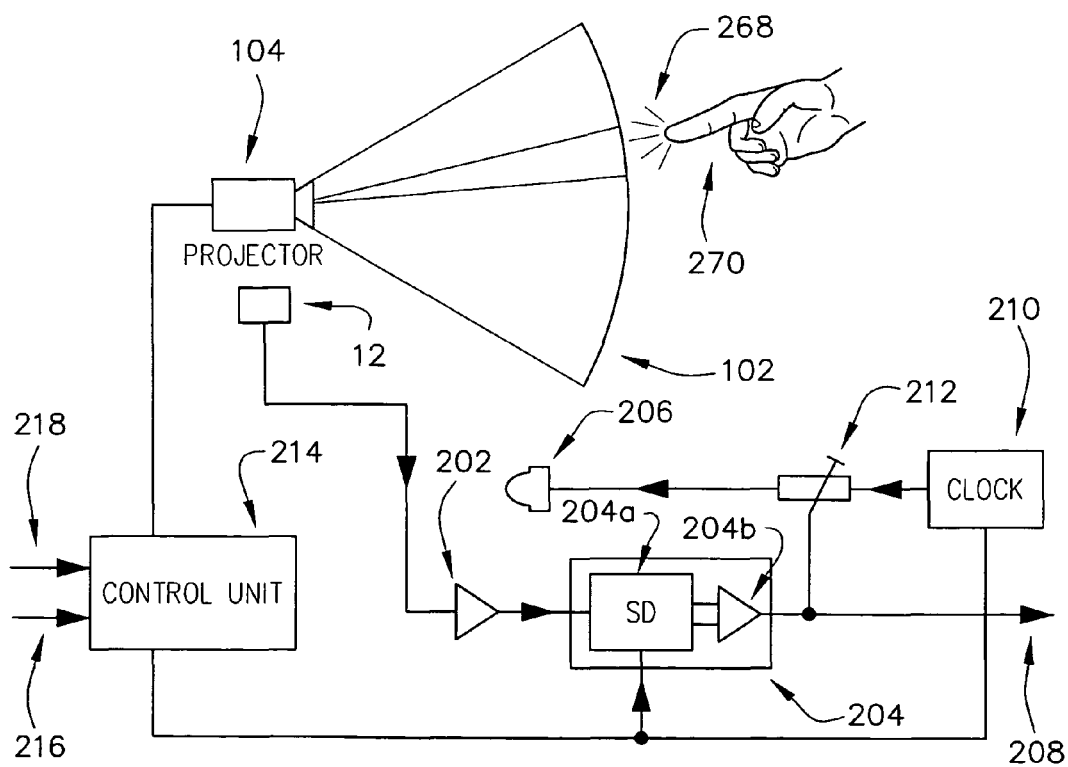
FIG. 9

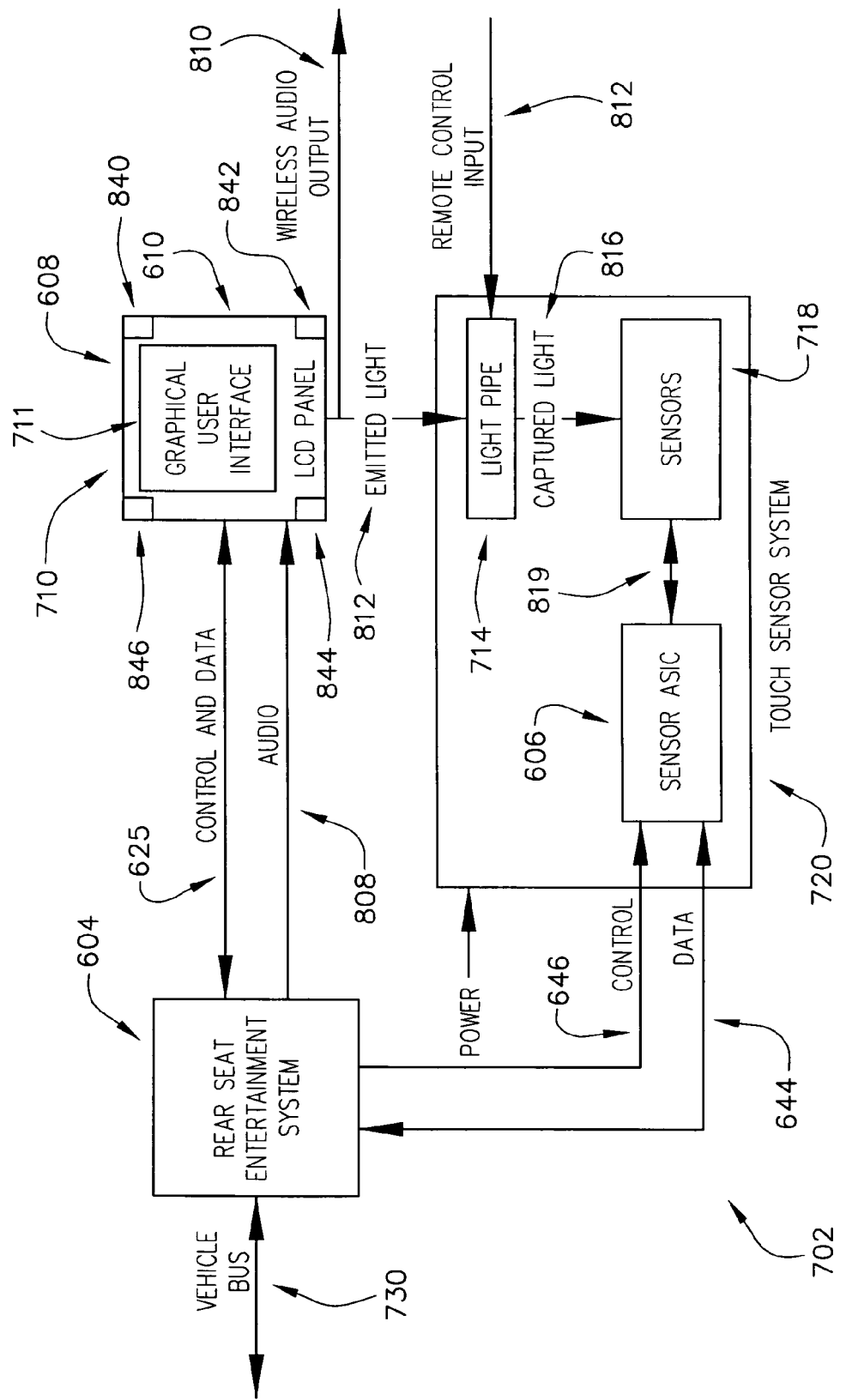

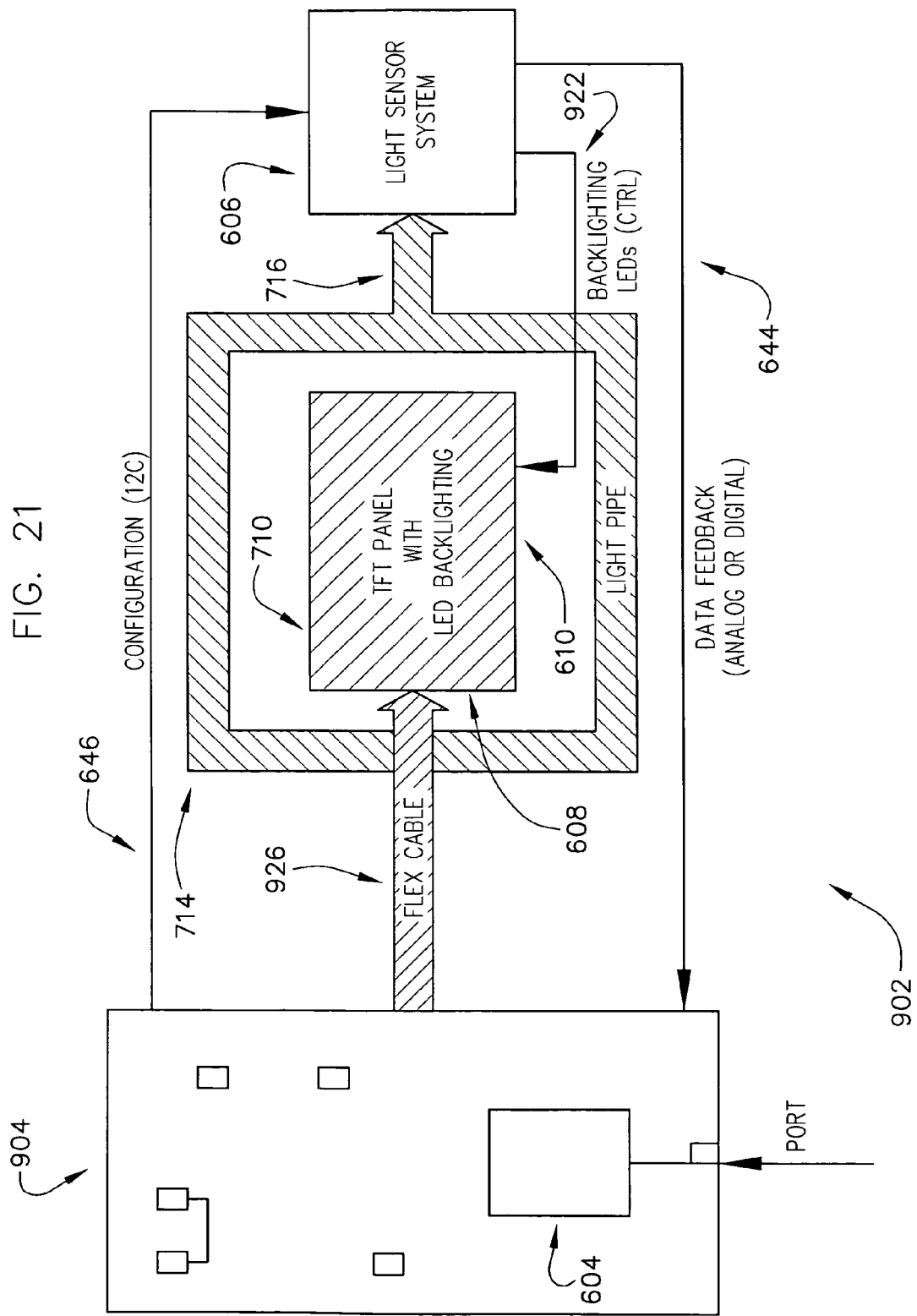

DISPLAY AND USER INTERFACE

CROSS-REFERENCE TO RELATED APPLICATIONS

This application is a national stage application of PCT/US2007/025046, filed Dec. 5, 2007, which claims priority to U.S. Provisional Patent Application No. 60/873,780 filed Dec. 8, 2006, the entire disclosure of both which are hereby incorporated by reference.

BACKGROUND

The application is generally directed to the field of display devices and mostly (although not entirely) to methods for registering commands selected on the display.

Many types of touch screens exist. For example, some conventional touch screens use capacitance to determine that a user has touched a screen. A company named Digital Dash has developed a touch screen technology that uses machine vision to determine that a user has touched a screen. However, drawbacks exist for the various types of systems that register a user's selection of a command of the touch screen.

SUMMARY

A control system allows a user to initiate commands by selecting control regions displayed by a display. The system uses a sensor that is configured to detect light or other electromagnetic radiation reflected by a user as the user approaches the control region being displayed on a display surface of the display.

The reflected radiation may be light used to display an image on the display, may be radiation used to wirelessly transmit data (e.g. audio data to a wireless headphone system), and/or may be some other type of radiation (e.g. light used solely to determine whether control regions have been actuated).

The radiation (e.g. light) to be analyzed may be given one or more unique characteristics such that the radiation (e.g. light) to be analyzed may be easier to identify. The unique characteristic could be any characteristic as discussed below. In some embodiments, the unique characteristic is a frequency at which the radiation is modulated. In some embodiments, the uniquely characterized radiation is associated with a particular control region. In other embodiments, the uniquely characterized radiation is generally provided and/or may be associated with more than one region.

The display may be any type of display. In particular embodiments, the display may be a flat panel display.

Other features may be gleaned from the disclosure below, including the examples and illustrative embodiments. Some embodiments will be combinations of any of the embodiments discussed above with each other (and all such possible combinations are contemplated) and/or with any of the additional features discussed below.

BRIEF DESCRIPTION OF THE DRAWINGS

FIG. 1 is a diagram of a touch sensor for a display according to one embodiment;

FIG. 2 is a display system using a panel display according to one embodiment;

FIG. 8 is directed to a control scheme for the correction of ambient light;

FIG. 9 is directed to a system for correcting for the presence of ambient light;

FIG. 20 is a diagram of a display system according to one embodiment;

FIG. 21 is a diagram of a display system according to one embodiment;

DETAILED DESCRIPTION OF EXEMPLARY EMBODIMENTS

Figure 3:
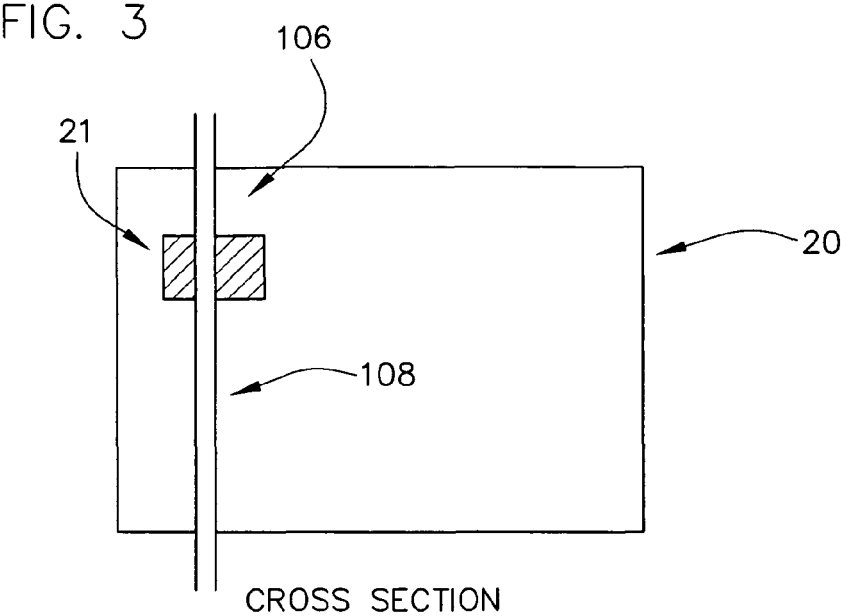
FIG. 3 is an illustration of a display screen having a control button according to one embodiment.

Referring to FIG. 1, a display system 10 includes a display 20 configured to provide a user with information. The display includes control regions 21 which represent areas of the display 20 that a user can actuate to control various functions of display 20 and/or non-display systems 28. Display 20 may display the information relating to the function controlled by control region 21 or control region 21 be "invisible" to a user such that the control regions 21 exist but a user would not be able to differentiate the area of the display 20 corresponding to the control regions 21. Further, some control regions 21 may be visible while others are not visible. Further still, a displayed image that appears to be a single control may include multiple control regions 21.

Actuation of a control (signified by a control region 21) by a user can be determined using a light-based control system. As a user approaches display 20 (e.g. points at a portion of display 20 with their finger), the user may tend to reflect light (e.g. reflect light) from display 20. Sensors 12,14 may be placed in regions around the display 20 such that they are capable of sensing this reflected light. Light guides 16,18 may be used to increase the areas in which light can be detected. Light guides 16,18 may be configured to guide light to sensors 12,14, which sensors 12,14 may be located in front of the display surface on which the image of a control region 21 is displayed and/or may be located behind the display surface on which the image of a control region 21 is displayed.

Display 20 may be configured to display different regions 19,21 with different characteristics which can be used to distinguish the regions 19,21. For example, each region 19,21 may be displayed at a unique time. Each pixel of display 20 could be actuated in sequence such that only one (or a limited number) of pixels are active at a given time (see, e.g., the embodiment of FIG. 2). As a second example, light displayed at each region may be displayed at a different amplitude. As a third example, each region 19,21 may be displayed using light that is modulated at a different frequency (see, e.g., the embodiment of FIGS. 3-7). As a fourth example, each control region 21 may be displayed using a unique color that may or may not be noticeable by a user. As a fifth example, the display back light may be modulated such that the position of the touch can be determined and correlated to the control region.

Sensors 12,14 can be configured to be capable of preserving at least a portion of these differences when light is captured by the sensors. For example, sensors 12,14 may be reactive enough to identify that light is being modulated at a high frequency, to give an accurate assessment of a time at which light was reflected by a finger, etc.

Processing circuit 22 is configured to receive the data output from the sensor and identify the differing characteristic of the various regions 19,21 of display 20 (e.g. may determine the coordinates of the display from which the light was reflected based on the data, may correlate a particular characteristic with a particular control region, etc.). Once processing circuit 22 identifies the value of the characteristic, processing circuit 22 can be configured to determine whether the characteristic corresponds to a control region 21 or a non-control region 19 and/or to determine the specific control region 21 to which the characteristic corresponds (if multiple control regions 21 are present).

Based on the determination of the control option, processing circuit 22 can be configured to send data (including control signals) to display driver 24 and/or various other systems 28, which may be used to control those systems 24,28.

Embodiment Using a Flat Panel Display and Time Differentiation

Referring to FIG. 2, one embodiment of system 10 includes a light guiding element 18 is placed around the perimeter of the front portion of a flat-panel display 20. Light guiding element 18 helps guide light into light sensor 12, which, as discussed above, may be in front of or behind the display surface of display 20.

Light sensor 12 and a controller (not illustrated) for display 20 provide data to a processing circuit 22 (FIG. 1). The controller for the display may be configured to control display 20 to illuminate each pixel individually and/or sequentially. The controller provides processing circuit 22 information indicating when display 20 is displaying each control region 21 (e.g. information such as the horizontal synch pulse, vertical synch pulse, and/or dot (pixel) clock of an LCD or other display). Based on this information, processing circuit 22 can be configured to determine whether an object is approaching a control region 21.

Light sensor 12 and a controller (not illustrated) for display 20 may be configured to provide data to a processing circuit 22 (FIG. 1). The controller for the display may be configured to control display 20 to modulate one or more of the back lights for the display. In other embodiments, processing circuit 22 may control the controller's modulation of one or more of the back lights of the display. In these embodiments, processing circuit 22 may or may not receive data from the controller. Processing circuit 22 may be configured to receive the data output from the sensor and identify approximate location (e.g. coordinates such as x & y coordinates, general region, etc.) on the display that correspond to the reflected light. Once processing circuit 22 identifies the location (e.g. coordinates), it may be configured to determine whether a user input has been received (e.g. if the location corresponds to a control region 21, a non-control region 19, or no region of the display), and/or send data (e.g. coordinates) based on the received (and possibly also processed) data to another circuit (e.g. over a vehicle communication system such as a vehicle bus).

For example, processing circuit 22 may be configured to record a time at which sensor 12 picks up reflected light and compare that time to the time during which pixels corresponding to the control region 21 are being illuminated. If they match, then a user is likely reflecting light generated by the control region. As another example, processing circuit 22 may control sensor 12 to only operate during those periods during which control regions are being illuminated on display 20. If sensor 12 detects light during those periods when it is operational, then processing circuit 22 may determine that a user is reflecting light generated by the control regions. As still another example, instead of (or in addition to) controlling sensor 12 to only operate during certain periods, processing circuit 22 may be configured to ignore/discard data (for the purpose of determining if a control region is being actuated) sent from sensor 12 during periods when no control regions 21 are active.

A control region 21 may be displayed using a number of pixels (e.g. at least about 20 or 40 pixels wide by at east 2 or 4 lines in some embodiments). Processing circuit 22 may be configured to look for reflections of light during periods when the more central pixels (i.e. the pixels not at one or multiple edges) are illuminated.

A panel display 20 may be formed from any number of different materials. For example, panel display 20 may be an LCD display, an OLED display, a solid-state display, etc.

Panel display 20 can be flat, as shown in FIG. 2, or may be formed in a non-flat shape such as a curved shape, including curved shapes that are bent around more than one axis.

A panel display may use a differentiating characteristic other than time differentiation and time differentiation may be used with displays other than panel displays.

Embodiment Using a Projector-Based Display and Frequency Differentiation

Figure 4:
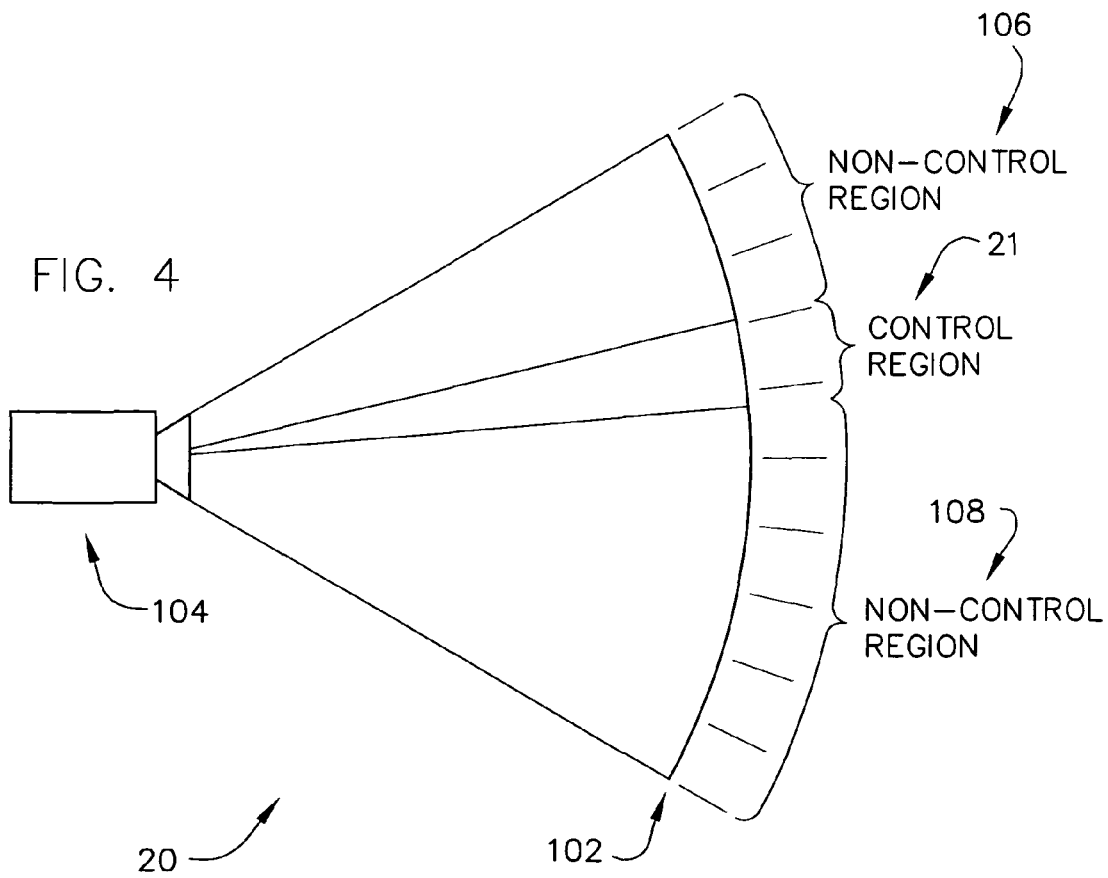
FIG. 4 is an illustration of a display system along the cross section illustrated in FIG. 4 according to one embodiment.

Referring to FIGS. 3 and 4, light is provided (e.g. projected) from an image source 104 (e.g. projector) of display 20 onto a display surface 102 (e.g. screen) of display 20. When image source 104 provides light to non-control regions 106,108, image source 104 may be configured to modulate its light source (not shown) at a first frequency (e.g. 180 Hz), and modulate light at a second frequency (e.g. 5000 Hz) when providing light to control region 21. In some embodiments, the second frequency will be at least 10 times that of the first frequency.

So that an image can be projected onto a curved surface 102, a light-scattering pane of suitable shape and light-scattering behavior may be used. The projector 104 behind this matte pane 102 can make use of any one of numerous different technologies.

The projector 104 may operate with a brightness frequency that is faster than the resolving time of the human eye. One type of projector 104 that may be used is a DMD ("Digital Micro-mirror Device") based projector display. This type of projection device may use a source of white light that passes through a filter wheel to send red, green, and blue components in succession to the DMD. In the DMD, very tiny mirrors are typically controlled in such a way that they reflect the light required for the image to be projected on a path leading to the screen 102. This light is generally projected in coordination with the rotation of the color disk to produce the correct color. Pixel intensity (brightness) may be controlled in this type of device by varying the amount of time during which a particular pixel is projected. Each mirror generally has its own projection point. If the light is reflected onto the screen for only short periods of time, the brightness at this point will be weak.

The mirrors tend to react so quickly that the eye sees only the final position of the mirror, not the path of reflection itself. At high reflection frequencies, the human eye with its slow reaction time generally does not perceive the rapid alternation of a pixel between light and dark as a series of individual events but rather as a brightness value, the intensity of which depends on the selected pulse-pause ratio.

FIG. 4 shows a cross section through a display 20 (see FIG. 3) that includes a projector 104 and the associated plane of projection 102 having a control region 21. The path and/or distance from the projector 104 to the plane of projection 102 can be altered by the use of mirrors, lenses, etc.

To differentiate control regions 21 and non-control regions 106,108, the control region 21 can be clocked at a frequency outside the spectrum of the pixels normally used for image data (the non-control regions 106,108).

As one example that may be used, for a display 20 targeting a frame frequency of 60 Hz (60 frame changes per second) then, on the basis of the division into red, green, and blue, the pixels are driven at a frequency of 3×60 or 180 Hz. A frame frequency outside of 180 Hz (e.g. 5,000 Hz) can be selected for the control region 21.

Figure 5:
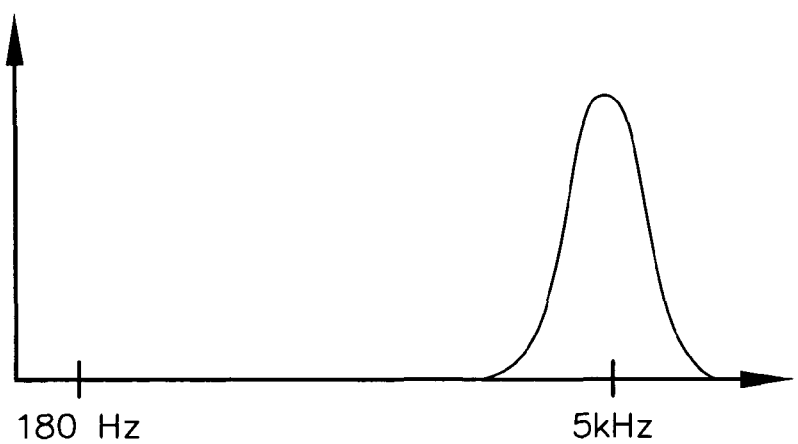
FIG. 5 is a diagram of a frequency of detected light as a user approaches a control region.

In the example discussed above, in the area of the control region 21 the emitted light frequency is increased from about 180 Hz to 5,000 Hz. A hand approaching the control region 19 to actuate it may tend to reflect some of the emitted light. This reflected light may be received by one or more photodiodes 12,14 (FIG. 1) placed at the edges of the control region 21, behind the control region 21, etc. As shown in FIG. 5, after appropriate amplification, a signal with a specific spectrum can be obtained at the output of an amplifier.

Figure 6:
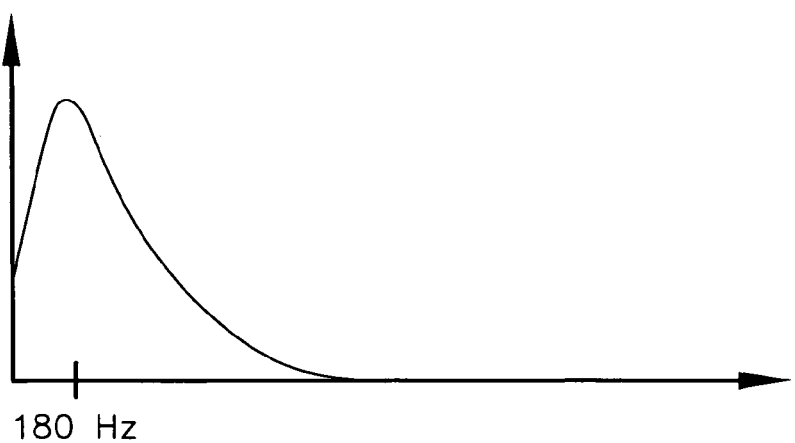
FIG. 6 is a diagram of a frequency of detected light as a user approaches a non-control region of the display.

In the areas 106,108 of display 20 outside of the control region 21, the spectral component of the reflected light will correspond to that of the actual image data as shown in FIG. 6.

Figure 7:
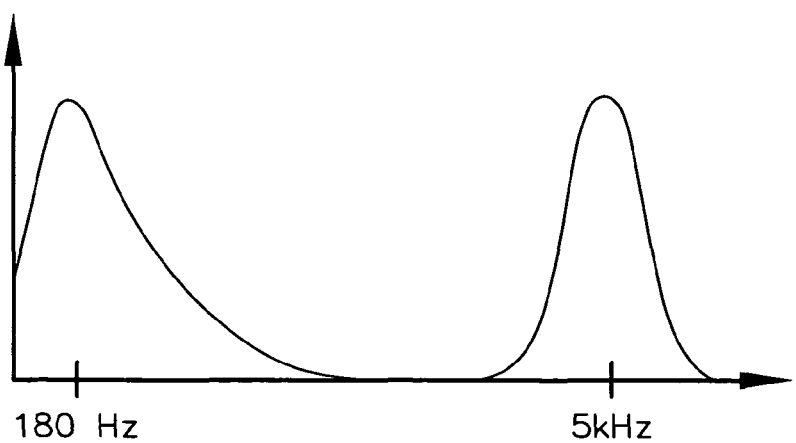
FIG. 7 is a diagram showing combined outputs of light reflected from a control and a non-control area of the display.

An optical sensor 12,14 (FIG. 1) may, of course, pick up the information from the control region 19 and the image data outside the control region 19 simultaneously. FIG. 7 shows the spectrum consisting of the non-control region 106,108 image data and the control region 21 image data as it would be detected by an optical sensor 12,14 that covers the entire illuminated area. Because the two spectral regions are distinguishable, it can be easier to assign the correct one to the light reflected from a finger.

If several control regions 21 (FIG. 1) are displayed simultaneously, they may be actuated in succession, making it possible to assign the reflection data present in the received signal to its associated control region 21. It is also possible to distinguish between reflections from different control regions 21 by the use of different frequencies for each control region 21. Any other different characteristics may also be assigned to the multiple control regions 21 to differentiate the control regions 21 (as discussed below).

Projector-based displays may use a technique for differentiating control regions other than frequency differentiation. Also, frequency can be used to differentiate control regions in displays other than projector displays.

Embodiment Using Intensity Differentiation

Referring back to FIG. 1, in addition to the methods described above that use characteristics of light as it is emitted by display 20 to distinguish control regions 21 from non-control regions 19, system 10 could also use characteristics of the light as it is received by sensors 12,14. For example, the intensity of light at one or more of sensors 12,14 may provide information suggestive of the location at which light is being reflected. If sensors 12,14 are placed at opposite corners of display 20, strong intensity at one sensor 12 and weak intensity at another sensor 14 may suggest that a user is reflecting light from a spot that is closer to sensor 12 than sensor 14. Equal intensity at light sensors 12,14 may suggest that user is reflecting light at a point that is equidistant from sensors 12,14.

In addition to the relative intensities of light received at sensors 12,14, the absolute intensity of light received by sensors 12,14 may provide information regarding the distance a point being "touched" by a user is located from the sensors. The intensity of light received by each of sensors 12,14 can be compared to the intensity of light being given off by display 20 (i.e. the brightness of display 20, particularly at a given point or points).

Light guides 16,18 can be used to affect the light intensity information received by sensors 12,14. Light guides may be shaped to provide additional information (e.g. could be designed to provide increased intensity at one or both sensors 12,14), could be placed in areas to provide more information (e.g. light guides that provide light to different sensors could have regions of overlap), could be made of materials of differing light conductivity (e.g. to provide more intense guiding of light on one side of a display 20 than the other side), etc.

A light sensor 12,14 may be configured to determine a relative intensity of multiple (e.g. two or three) frequency ranges (colors) of light. In this case, the relative intensities of the colors received by sensors 12,14 may be compared to the various relative intensities of colors in the various regions of the image displayed by display 20 to provide information regarding which region is being "pressed" by a user.

Embodiment Using a Panel Display and Frequency Differentiation

Figure 17:
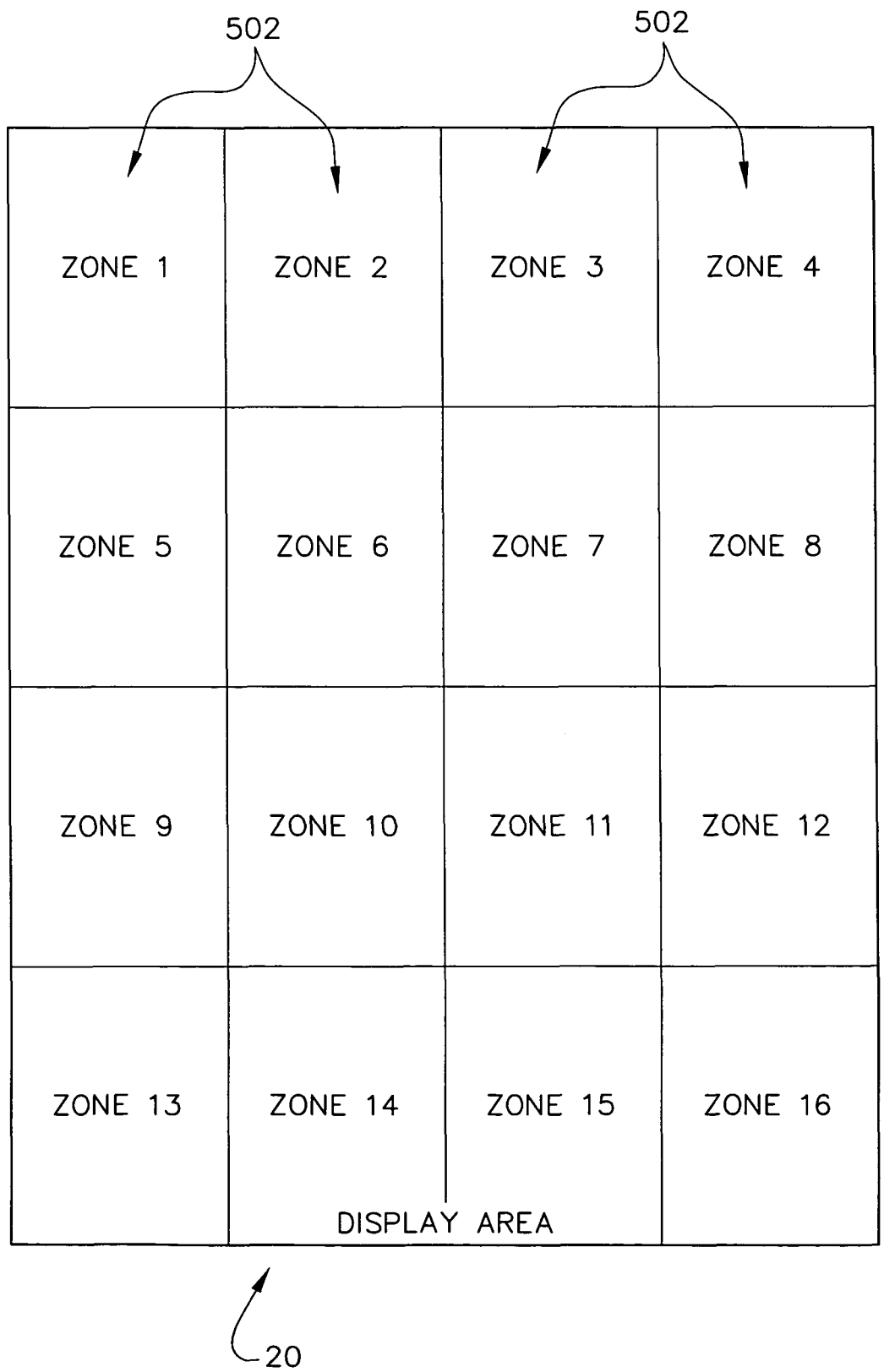
FIG. 17 is an illustration of a display screen having a control button according to one embodiment.

Referring to FIG. 17, a panel display includes areas illuminated by separate lighting elements. An area 502 can be one pixel in size or can be a zone. The lighting element for each area 502 can be illuminated with a different characteristic. For example, each lighting element can be modulated at a different frequency. As another example, each area can use a different frequency (e.g. color or shade of color) or light. Different frequencies of light can be purposely chosen, or variation may be an inherent property of the light source. For example, different LEDs from different "bins" may have different frequencies for a given color. In either case, the characteristic may be determined (e.g. during manufacture) and stored in the memory of processing circuit 22. As another example, each region may be illuminated at a different time. For example, Zone 1 and Zone 9 may both be operated at the same frequency, but might be operated at different times which allows processing circuit 22 to differentiate between Zone 1 and Zone 9.

Based on the differing characteristics for each zone 502, processing circuit 22 can determine which zone 502 is being actuated by a user. Differences within a zone 502 (color, relative color intensities, time, etc.) can be used to differentiate various portions of the zone 502. In other embodiments, control regions 21 may occupy an entire zone 502. Such zones 502 may be specially shaped (i.e. shaped different from other zones) to conform to a desired shape for control regions 21.

In one example, display 20 may be an LCD panel display that is backlit by one light source with separately controllable areas, or which includes more than one light source. The light source(s) may be an LED (e.g. an OLED), may be an electroluminescent (EL) light source (e.g. an EL panel), a cold cathode fluorescent lamp (CCFL), a hot cathode fluorescent lamp (HCFL), an incandescent light source, a solid state light source, and/or may be some other light source. If a single LED is used for a given zone 502, the LED would preferably have a spectrum that includes light in at least three (e.g. red, blue, and green) color regions (e.g. a blue LED with red-emitting and green-emitting phosphors).

Exemplary Display Systems

Figure 18:
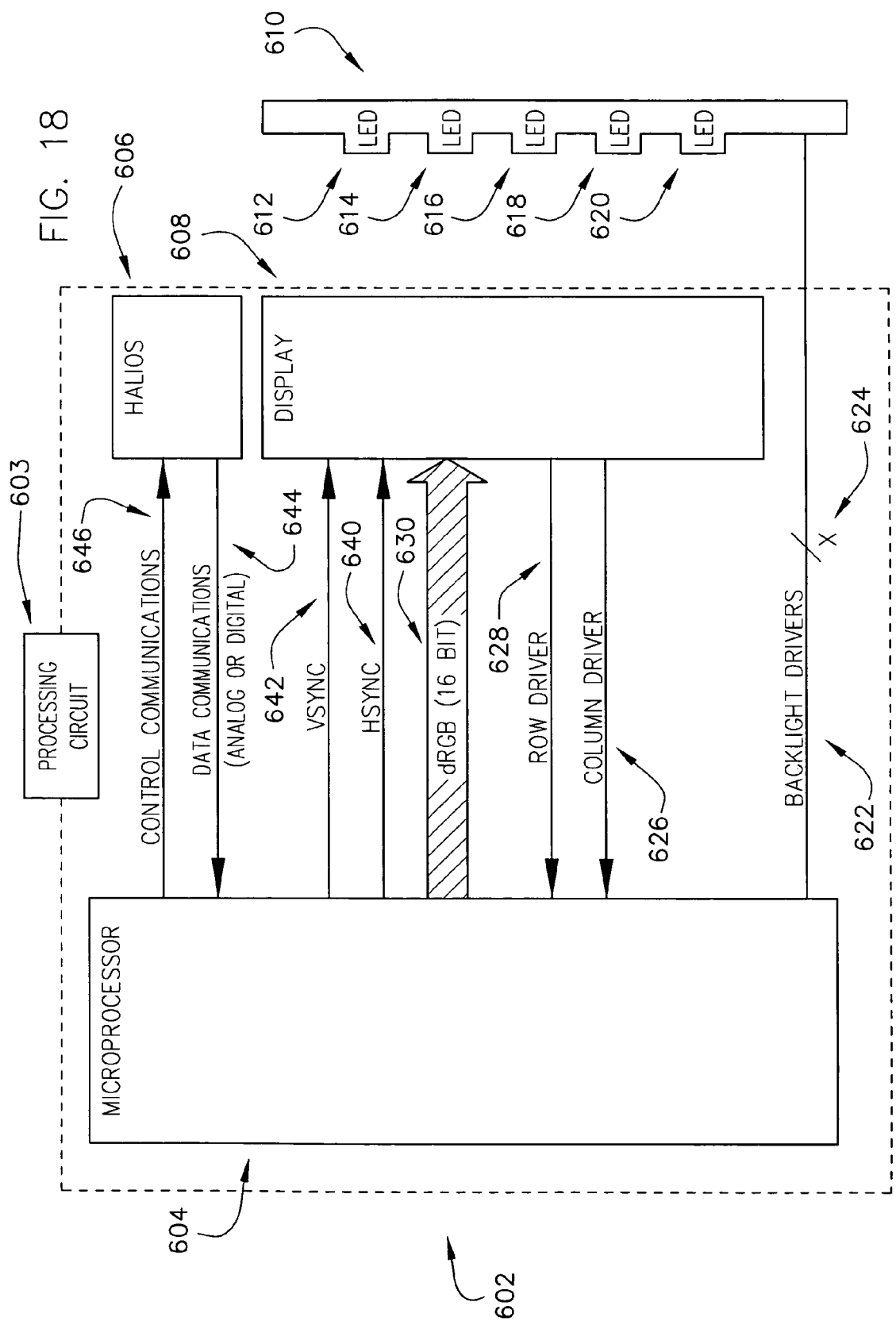
FIG. 18 is a diagram of a display system according to one embodiment.

Referring to FIG. 18, an exemplary display system 602 incorporating a user input sensor system includes a processing circuit 603. Processing circuit 603 includes a processor 604, a sensor circuit 606 (e.g. an integrated circuit (IC), such as an ASIC, configured to process data from a sensor), and a display control circuit 608.

Processor 604 coordinates operation of the display system 602. Processing circuit 604 sends data 630-642 to display control circuit 608 to control the information being displayed on the display controlled by display control circuit 608. For example, processing circuit 604 may provide image data 630, a horizontal timing signal 640, and/or a vertical timing signal 642 to display control circuit 608 which may be used by display control circuit 608 to control a display to display information. The displayed information may include control regions. Processor 604 retains data relating to which control region(s) were displayed at which locations (and/or at which times) on the display. Display control circuit 608 may be configured to process the data 640-642 received from processing circuit 608 and provide data 626-628 back to processing circuit 604. For example, display control circuit 608 may be configured to control a display to display information based on the data 630-642 received by display control circuit 608 but not at the exact time dictated by the timing data 640, 642 received by display control circuit 608. Display control circuit 608 may be configured to provide exact timing data 626,628 (e.g. data 628 relating to the operation of a row driver circuit and data 626 relating to the operation of a column driver circuit used to control the display) back to processing circuit 604, which data may be stored (at least temporarily) by processing circuit 604 (e.g. processing circuit 604 may be configured to store data—based on data 626,628—relating to when and/or where control regions were displayed by the display).

Processor 604 may also be configured to control an illumination system 610 used to display information on the display. For example, the display may be a panel display that is backlit by one or more light sources 612-620 (e.g. solid state light sources such as LEDs, OLEDs, EL panels, etc.). Processor 604 may be configured to send a control signal 622 that is configured to control illumination of one or more light sources 612-620. Control signal 622 may include one or more signals 624 where each signal 624 may be configured to control operation of one or more light sources 612-620 of illumination system 610. Processor 604 may be configured to modulate one or more light sources 612-620. For example, processor 604 may be configured to modulate two or more (e.g. at least three, at least four, at least five, or more) light sources 612-620 at different frequencies than other light sources 612-620 such that sensor 606 would be able to identify light received from the specially modulated light sources 612-620. As another example, processor 604 may be configured to control timing of when light sources 612-620 are providing illumination such that two or more (e.g. at least three, at least four, at least five, or more light sources) are illuminated during distinct periods identifiable by a sensor circuit 606. The light sources 612-620 illuminated may be constantly changing, or the light sources 612-620 may be constantly illuminated except for short durations (e.g. less than 20%, less than 15%, less than 10%, less than 5%, and/or less than 1% of the total time during which light is provided by light sources 612-620) during which the light sources are specially modulated to provide the distinct periods. As another example, light sources 612-620 may be illuminated cyclically (e.g. may be pulse width modulated) and two or more (e.g. at least three, at least four, at least five, or more) light sources 612-620 may be illuminated out of phase with each other and with the other light sources such that a sensor circuit 606 may be able to identify light from the light sources 612-620 that are out of phase.

The unique characteristics of light imparted by processor 604 (e.g. timing 640, modulation 622, color 630, etc.) may be used to uniquely identify light reflected by a user as the user approaches a control region. In some embodiments, the unique characteristics could also be used to identify that a user is approaching non-control regions.

In particular, processor 604 may provide data 646 to a sensor circuit 606. The data 646 may include configuration data (e.g. data used to control settings of the sensor such as sampling frequency, ASIC set-up, etc.), data relating to the operation of the display-based control system (e.g. data relating to the unique characteristics of the image displayed such as characteristics of light from the light sources like color, modulation frequency, modulating timing, and/or other characteristics of light from the light sources; characteristics such as timing of the display of the control regions; etc.).

Sensor circuit 606 may be configured to receive sensor data from the sensor representative of a light input received by the sensor, and may process the sensor data based on the data 646 received from the processor 604. Sensor circuit 606 provides output data 644 based on the processed data. In some embodiments, sensor circuit 606 may be configured to provide data representative of a location on the displayed image that may have been actuated by a user (e.g. may provide a coordinate—such as an x-y coordinate—of a location actuated by a user, may provide data relating to which control region was actuated by the user, etc.).

Processor 604 is configured to receive the data 644 from sensor circuit 606. Processor 604 may further process the data. In some embodiments, processor 604 may process the data to control a system based on the data 644. For example, processor 604 may correlate data 644 from sensor circuit indicative of which control region was actuated and implement the command associated with the control region. Implementing the command may include implementing the command in the processor 604 (e.g. changing the information 630 displayed on a display, etc.), sending a control signal to a separate system to control a function of that system (e.g. control a rear seat entertainment system, control an HVAC system, control a GPS system, etc.), or could include implementing the control by some other means. The processing of the data 644 to implement the command could include correlating coordinate information 644 received from sensor circuit 606 with data (e.g. data 626-630) relating to the information displayed by the display to identify control regions corresponding to the coordinates identified by sensor circuit 606, correlating a control region identified (e.g. by sensor circuit 606, by processor 604, etc.) with a specific command (e.g. a set of commands) to be implemented, etc.

Figure 19:
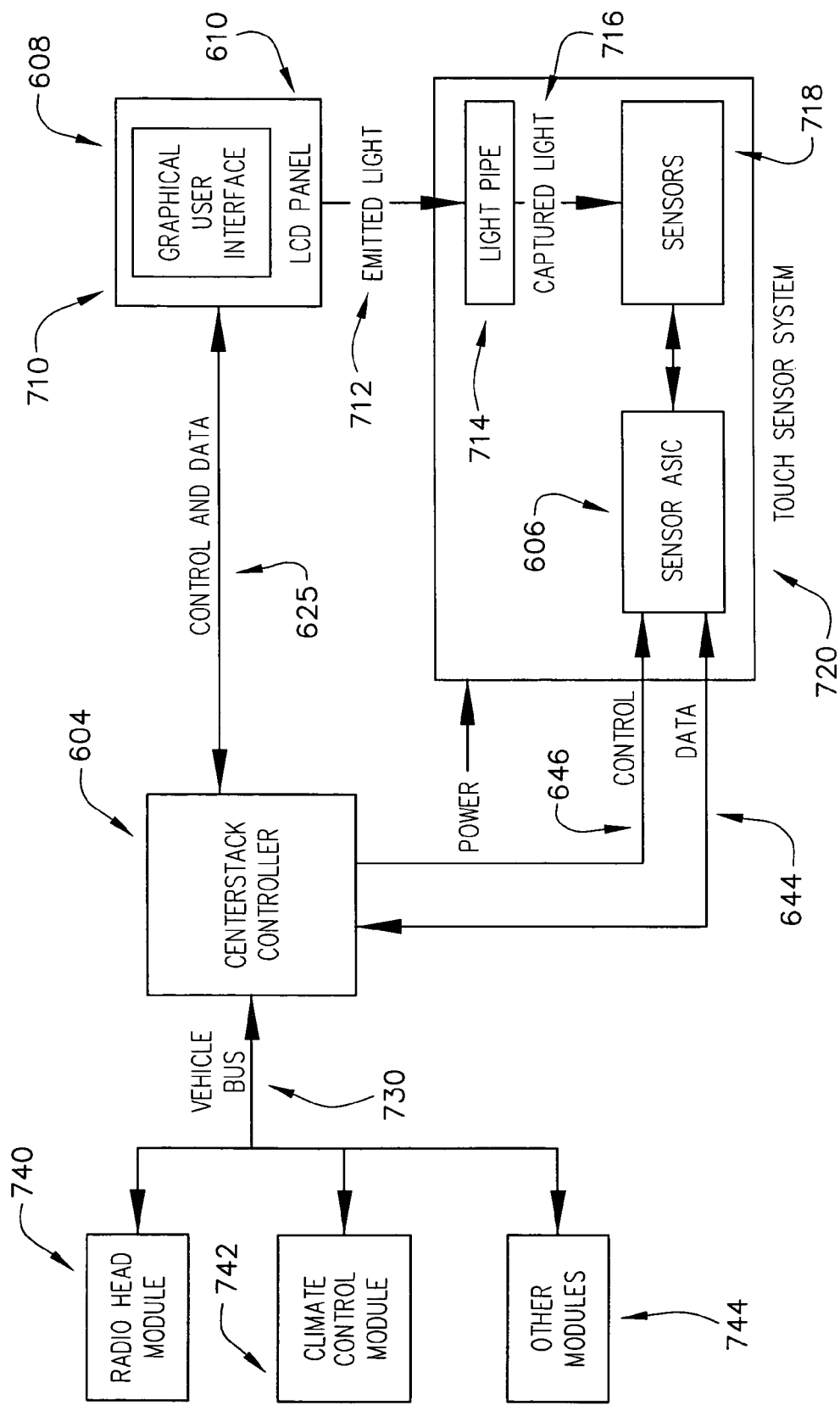
FIG. 19 is a diagram of a display system according to the embodiment of FIG. 18.

Referring to FIG. 19, a display system 602 may be constructed similarly to the system of FIG. 18. Display system 602 includes a display 710 (e.g. an LCD panel display) and a touch sensor system 720. Display 710 may be configured to display control regions on a graphical user interface (GUI) 711, and touch sensor 720 may be configured to determine whether a user has actuated one of the control regions. Touch sensor 720 may be configured to determine whether a control region has been actuated without requiring that a user actually touch display 710 (or, in some embodiments, touch any portion of display system 602).

In operation, backlights 610 for display 710 may be given a characteristic as discussed with respect to FIG. 18. Light 712 from display 710 is reflected and collected by light pipe 714, which may be a light guide used to display information on display 710 (e.g. a light guide of an LCD panel), may be a separate light guide, and/or may use both a light guide of display 710 and a separate light guide.

Light 716 captured by light pipe 714 is transferred to sensor 718 which produces a signal 719 based on the light 716 received. A sensor circuit 606 may be configured to processes the signal 719 received from sensor 718 to provide output data 644 (as discussed above).

The output 644 of sensor 606 may be provide to a processor 604 which may be a vehicle controller such as a centerstack controller that controls various input devices and/or displays associated with the vehicle's centerstack. Processor 604 may be coupled to other vehicle systems 739 (e.g. a radio module 740, a climate control module 742, and/or some other module 744) directly or indirectly (e.g. over a vehicle bus 730 which may be wired or may be wireless).

Referring to FIG. 20, a display system 702 may be configured similarly to the display systems of FIGS. 18 and 19. Display system 702 is configured to provide wireless transfer of an audio output 810 (e.g. via an infrared signal to an IR headphone), wireless receipt of commands from a remote control input 812 (e.g. an IR remote), and a touch screen user input system 720 using common components.

Display system 702 operates similar to system 602. Instead of (or in addition to) controlling light sources 610 to have unique characteristics, system 702 may also include additional light sources 840-846 (e.g. infrared light sources or sources of non-visible light generated from any of the types of light sources discussed above or below) that are configured to provide a light output 812. Light sources 840-846 may be located behind a graphical output surface of display 710 (e.g. behind the liquid crystal gates of an LCD display, behind the display screen of a projector-based display, etc.), to the side of the display 710, and/or in front of the display 710. Light output 812 may be reflected by a user approaching display 710, and routed to sensor 718 via light pipe 716 as discussed above. Light output 812 may also be used to provide an audio output 810. For example, light output 812 may include a frequency, amplitude, or otherwise modulated signal portion that carries audio content.

In addition to receiving light 812,816 reflected from a user (e.g. a user's finger, a pointer, and/or some other object) approaching display 710 (representing possible actuation of a control region of graphical user interface 711), sensor 718 and/or light pipe 714 may be configured to receive an input signal 812 from a remote control (e.g. a remote control used by a user to control display system 702 and/or other systems). Sensor circuit 606 may be configured to process a signal 819 portion based on a signal 812 received from a remote control, or may be configured to pass along the remote control signal portion unprocessed.

In this manner, a touch input system 720 from user input from a user approaching a control region of display 710, a wireless remote control system, and a wireless audio system can be implemented in a single device by using common components.

Referring to FIG. 21, a display system 902 may be constructed similar to display system 602 discussed above. Display system 902 differs from display system 602 in that one or more of light sources 610 are controlled by sensor circuit 606 via a control line 922.

Similar to display system 602, display system 902 may be connected to display 710 (e.g. circuit 608) via a flexible cable, which cable may transport one or more signals 626-642 (FIG. 18) between processor 604 and circuit 608. Also similar to display system 602, display system 902 may include processor 604 on a circuit carrying element 904 separate from display 710 (including circuit 608) and sensor circuit 606. Circuit carrying element 904 may include various other control circuits for controlling display 710, interacting with sensor 606, processing data, controlling other systems, communication over a vehicle bus, and/or other functions. In other embodiments, two or more of the sub-circuits of processing circuit 603 (FIG. 18) (e.g. processor 604, display circuit 608, sensor circuit 606, etc.) may all be carried by a common circuit carrying element (e.g. circuit carrying element 904).

Figure 23:
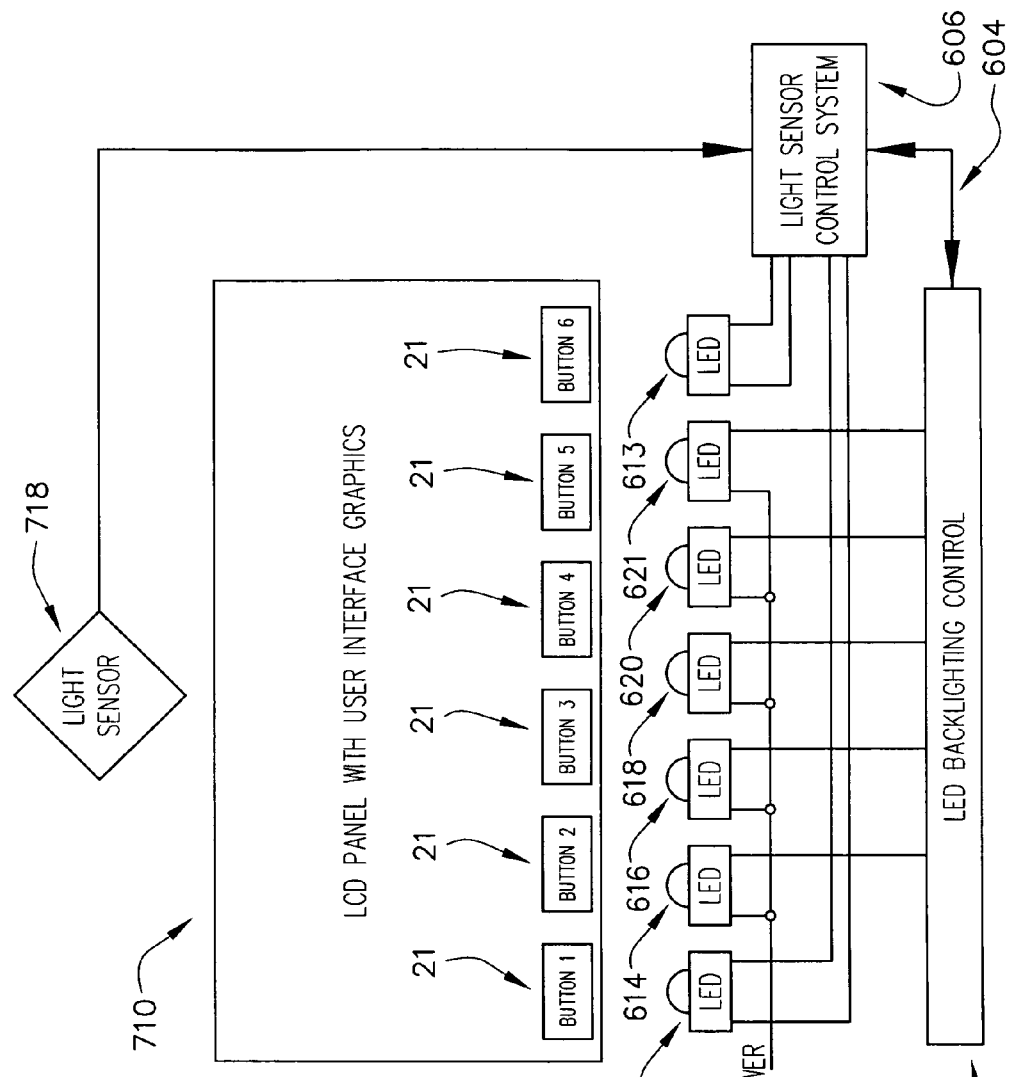
FIG. 23 is a diagram of a display system according to the embodiment of FIG. 22.
Figure 22:
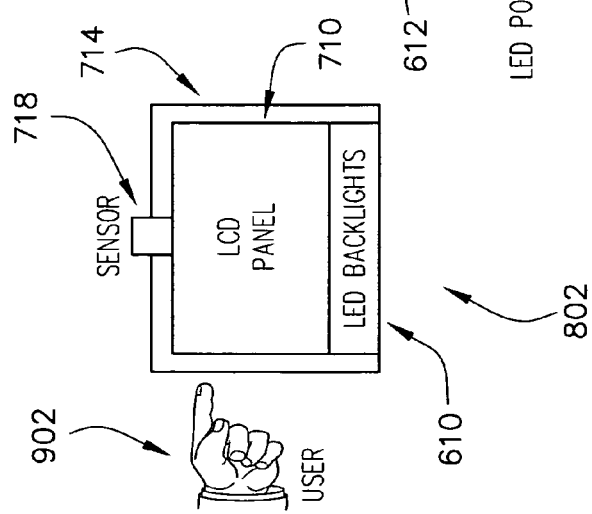
FIG. 22 is a diagram of a display system according to one embodiment.

Referring to FIGS. 22 and 23, a display system 802 is constructed in a manner similar to display system 602. System 802 differs from system 602 in that some of light sources 614-621 are controlled by processor 604, while others of light sources 612-613 (e.g. at least two light sources, at least three light sources, at least four light sources, and/or more light sources), such as two or three light sources, are controlled by sensor circuit 606. In some of these embodiments, the light sources 612-613 that provide the light used by system 602 to determine whether a control region 21 has been actuated (e.g. light having a detectable characteristic) are controlled by sensor circuit 606, while the other light sources are controlled by processor 604.

Figure 24:
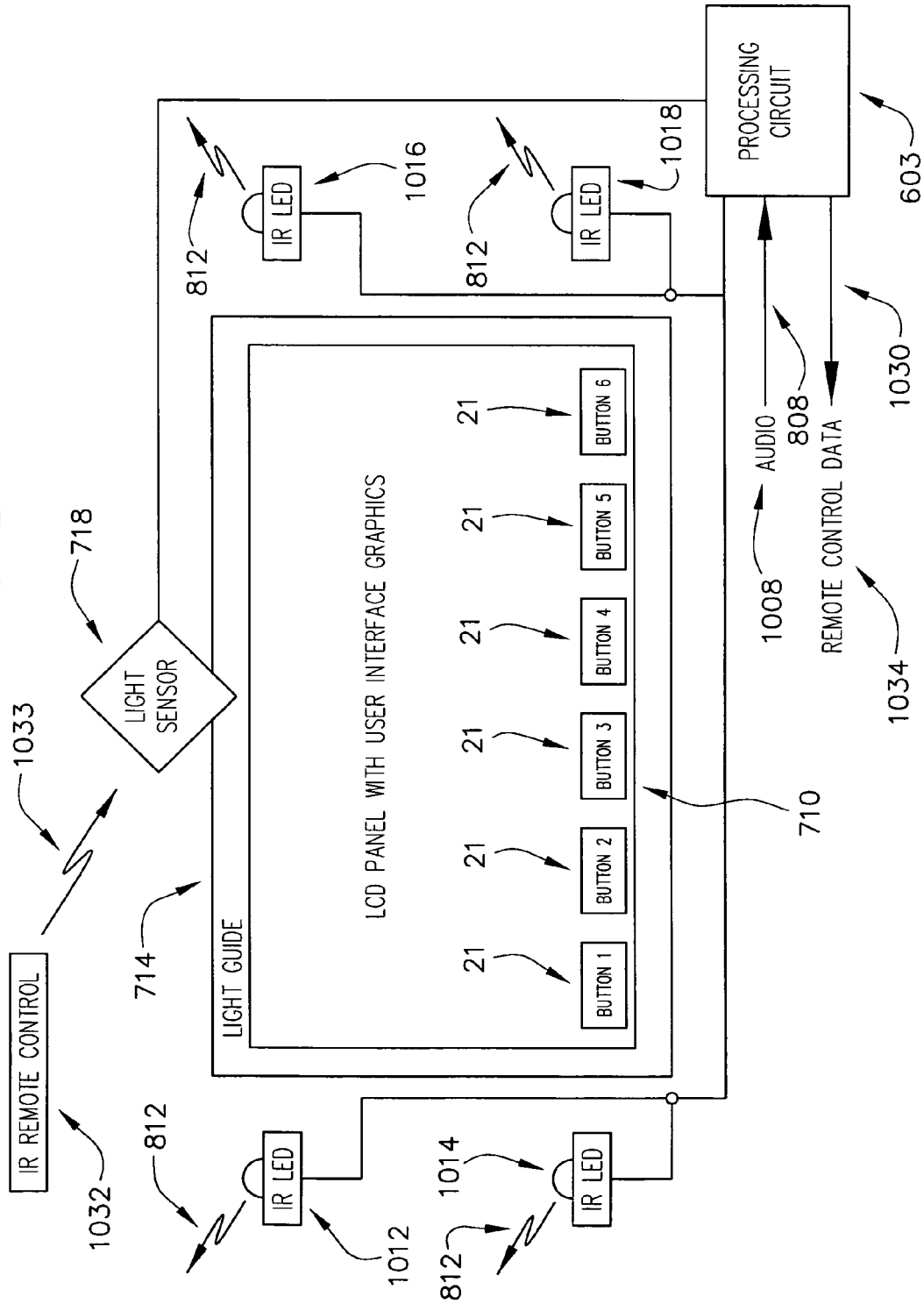
FIG. 24 is a diagram of a display system according to one embodiment.

Referring to FIG. 24, a display system 1002 is constructed similarly to display system 702 (FIG. 20). Display system 1002 uses a light sensor 718 that may receive light reflected from a user that is indicative of actuation of control regions 21 displayed on a display 710, and light (e.g. infrared light) 1033 encoded with commands provided by a remote control 1032. A signal based on the light 1033 containing the commands may be received by processing circuit 603 from sensor 718, and, in response, processing circuit 603 may output commands (or other data based on the commands) as data 1034 to other systems.

Display system 1002 also includes light sources 1012-1018 that provide output light 812 in a manner similar to any of those discussed above or below (e.g. in one or more of the manners discussed with respect to light sources 812-820 of FIG. 18). Light output 812 may also be used to provide data such as an audio output (similar to output 810 of FIG. 20). The audio output may be based on an audio signal 1008 received by processing circuit 603.

Light sources 1012-1018 may be directly or indirectly controlled by one or more portions of processing circuit 603, such as sensor circuit 606, processor 604, display circuit 608, etc.

Additional Features of System 10

Still referring to FIG. 1, sensors 12,14 may be located in front of the display surface (e.g. screen) of display 20 and/or may be located to the sides of display 20. In some systems (such as those using a projector or a light guide), sensors 12,14 may be located behind the display surface 102 (FIG. 4) of display 20. Generally, being in front of or to the side of display 20 is judged with respect to the display surface 102 of the display 20.

Additionally, while two sensors are shown, any number of sensors (e.g. 1 sensor, a plurality of sensors, a large number of sensors, etc.) may be used. The sensors may be point sensors (such as diodes) which have a resolution of 1×1, or may include an array sensor (e.g. a sensor comprised of an array of diodes, a CCD sensor, a CMOS sensor, etc.) which has a resolution of N×M pixels (e.g. an array where N=1, where M=1, where N>1, and/or where M>1). In some embodiments, one or more sensors have up to 2500 pixels, up to 2000 pixels, up to 1000 pixels, up to 500 pixels, up to 400 pixels, up to 300 pixels, up to 200 pixels, up to 100 pixels, up to 75 pixels, up to 50 pixels, up to 25 pixels, up to 15 pixels, and/or up to 5 pixels. Each of the sensors 12,14 that are used may be a same type of sensor or may be different types of sensors. In most embodiments, light sensors 12,14 are not cameras.

Light guides 16,18 can take any shape or configuration that transfers light to sensors 12,14. Light guides 16,18 may be configured to have a shape that conforms to an instrument console, to a shape of the display 20, or to some other shape. Light guides 16,18 may be elongated, may be curved, may be an abstract shape, and/or may take some other form. Light guides 16,18 would ideally be suited to transfer light from anywhere around the perimeter of display 20 to sensors 12,14, which sensors 12,14 may be located on a front side, to the side of, and/or behind the display face of display 20. But light guides 16,18 may only transfer light from more limited areas in some embodiments that include light guides 16,18. Light guides 16,18 may be formed from plastic, acrylic or some other material. Light guides 16,18 may be comprised of light pipes.

Display 20 may include backlighting which uses a light guide (e.g. light pipe) to distribute light for backlighting. This light guide may also be used to guide light that is reflected by an object approaching display to sensors 12,14 (i.e. light guides 16,18 might be or comprise the light guide of the back light for the display).

Display 20 may be a single display or may be formed from multiple displays. In one embodiment, display 20 is a single display where the single display imparts the different characteristics to the control regions 21 and the non-control regions 19. In other embodiments, display 20 may include multiple image generating portions 104 (FIG. 4) (e.g. projectors) where each image generating portion is separately controlled to generate control regions 21 and/or non-control regions 19. A single image generator 104 (e.g. projector) may be used to provide displays to multiple surfaces of a screen (or screens) which may appear different to a user. For example, a single projector may provide images to both a primary informational region 20 (FIG. 4) and to reconfigurable control options (e.g. separate buttons, knobs, etc.) separate from the primary display area 20.

Display 20 may be a projector type display, may be a panel display (e.g. where the display elements are located proximate to the display surface rather than being projected—such as non projected LCD displays, OLED displays, VF display, etc.), may be a cathode-based display, may use some other type of display, and/or may use a combination of these types of displays. For projector type displays, the display could be a DMD (digital micro-mirror display) or could be any other type of projected display. Panel displays may be flat panel display or may be formed into non-flat shapes such as curved shapes.

Figure 16:
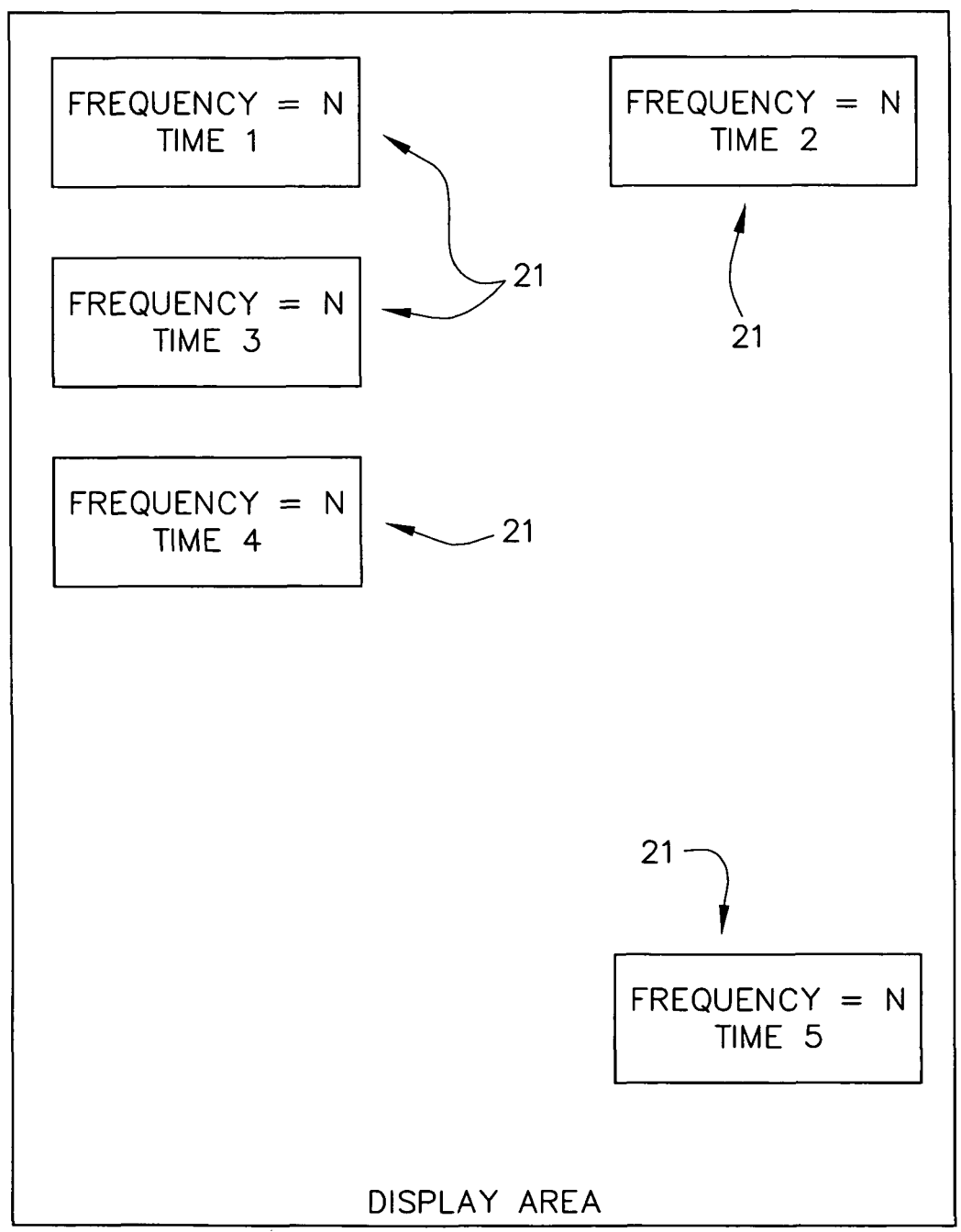
FIG. 16 is a display screen using both time and frequency to differentiate various control regions.

Any combination of unique characteristics may be used to identify unique regions 19,21. For example, four control regions 21 may be separately identified by displaying control regions with light modulated at two frequencies (A and B) where the control regions are displayed at two separately identifiable times (1 and 2). This would allow four different frequency/time pairs (A1, A2, B1, and B2) to be established, where each of the four unique pairs could correspond to a unique control region 21. Also, a third (or more) criteria could also be added (e.g. whether infrared light was also detected) to differentiate the various control or non-control regions. As another example, a single frequency could be used for control regions 21 (to differentiate control regions 21 from non-control regions 19) and time variation could be used to differentiate between the control regions 21. See, for example, the embodiment illustrated in FIG. 16.

Processing circuit 22 may include multiple components that, in some embodiments, may be spread across multiple circuit carrying elements (e.g. PCBs) and whose components may or may not be located in proximity to each other. For example, processing circuit 22 could include an ASIC configured to receive data from sensors 12, 14 and process the data to output data signifying the frequency at which the light received by sensors 12, 14 were modulated. Processing circuit 22 could then also include a microprocessor configured to receive the data from the ASIC, determine which (and/or whether a) command was chosen by a user based on the data received from the ASIC, and to control display 20 and/or output command (or other) data to other vehicle systems 28 based on the determination.

Processing circuit 22 can include various types of processing circuitry, digital and/or analog, and may include a microprocessor, microcontroller, application-specific integrated circuit (ASIC), field programmable gate array (FPGA), or other circuitry configured to perform various input/output, control, analysis, and other functions to be described herein. Processing circuit 22 may be configured to digitize data, to filter data, to analyze data, to combine data, to output command signals, and/or to process data in some other manner. Processing circuit 22 may also include a memory that stores data. Processing circuit 22 could be composed of a plurality of separate circuits and discrete circuit elements. In some embodiments, processing circuit 22 will essentially comprise solid state electronic components such as a microprocessor (e.g. microcontroller). Processing circuit 22 may be mounted on a single board in a single location or may be spread throughout multiple locations which cooperate to act as processing circuit 22, including components connected across a vehicle bus 26. In some embodiments, processing circuit 22 may be located in a single location and/or all the components of processing circuit 22 will be closely connected.

Processing circuit 22 may be configured to wait for a confidence level prior to affirmatively registering that a control region 21 has been selected. For example, processing circuit 22 may be configured to check to see if a control region 21 has been indicated a selected multiple number of times before executing the command associated with the control region 21. Processing circuit 22 may be configured to wait until a control region 21 is consistently identified as selected (e.g. over 50% or over 70% or over 90% of the actuations identified by processing circuit 22 indicate that the control region 21 has been selected). Other criteria can also be used to provide confidence that the control region 21 has been purposely selected.

Processing circuit 22 may also be configured to control display 20 to change the manner in which a control region 21 is displayed if processing circuit 22 determines that a user may be approaching the control region 21. For example, processing circuit 22 may be configured to enlarge an area of display 20 associated with control region 21 if processing circuit 22 determines that a user is approaching the control region 21 (see, e.g. FIGS. 10-12). Enlarging the area of display 20 may allow processing circuit 22 to more accurately register a desired position for the control region 21. As another example, processing circuit 22 may be configured to change the types of graphics used to indicate the control region 21 if processing circuit 22 determines that a user is approaching the control region 21 (see, e.g. FIGS. 10 and 12). Processing circuit 22 could be configured to control display 20 to change any control region 21 in response to a user's approach, some types of control regions 21, no control regions 21, the types of control regions 21 pre-selected by a user, etc.

Processing circuit 22 may be configured to provide data (including command signals) to other systems 24,28. For example, processing circuit 22 may be configured to control (and/or may include) a display driver 24 that is configured to control various aspects (mirror position, pixel addressing, light intensity, etc.) of display 20. For a display system used in a vehicle, processing circuit 22 may be configured to provide data to various other vehicle systems 28. Processing circuit 22 may provide this information across a vehicle bus 26, through a direct link 30 (which could include a wireless link such as a Bluetooth link), by having common components (e.g. a common microprocessor) with one or more of the vehicle systems, etc. Processing circuit 22 may also be configured to receive information from the various other vehicle systems 28 such as information to be displayed on display 20.

Sensors 12,14 (particularly in combination with light guides 16,18) may be configured to receive light that is scattered in multiple directions. For example, sensors 12,14 may be configured to receive light that is scattered in substantially opposite directions (e.g. scattered in directions whose vectors are separated by at least about 150° or 165° and/or scattered in directions that are separated by at least about 150° or 165° observed from the plane formed by the sensors and/or sensor system—sensors 12,14 and light guides 16,18).

According to some embodiments, system 10 may be configured to be able to identify a user actuation of a control region 19 at a distance from the display/graphic surface 102 (FIG. 4) of display 20. For example, system 10 may be configured such that it is capable of identifying a user actuation of a control region from a position above the control surface without a user touching the display surface (e.g. at about at least 1 cm, about at least 2 cm, and/or at about at least 3 cm from the display surface). According to some of these embodiments, system 10 may be configured to identify a user actuation of a control region at about 5 cm. System 10 may be configured to take action based on the identification, at one or more of these distances, that a control region has been actuated (e.g. may initiate the action indicated by the control region, may identify the control region as the user's likely target and bring it to the forefront, etc.).

According to some embodiments, an interactive touch-free method for operating curved surfaces, especially image-display screens, may be provided. A certain gap (e.g. 5-10 cm) may be maintained between the operating surface and the operator. For example, system 10 may include a transparent/translucent barrier (e.g. a plastic or acrylic panel) between the display surface 102 (FIG. 4) and a user of the system. Sensors 12,14 may be located behind the barrier, may be located in front of the barrier, or may have some other location.

In a display 20 that uses a mirror-based technology, mirrors which are not reflecting any light to the screen 102 (FIG. 4) for certain pixels (all parts of the screen which are not 100% white) can be used to reflect the light that is reflected from a finger to a light sensor 12,14. Thus, a lens system of a projector 104 (FIG. 4) may be configured to perform at least two functions; generating the image and sending light from the reflecting element (the finger) to the light sensor 12,14.

Control regions 21 of display 20 can take any number of forms. Control regions 21 may be displayed as individual buttons, keypads, interactive images (such as interactive images that have nothing in common with "conventional" buttons), etc.

Multiple control regions 21 may be used to implement the control function of a control which is displayed as a single control. For example, the control region 21 may be displayed as a slider, a knob, etc. In this case the image of the control knob may be designed to consist of two or more control regions 21. The user sees the picture of a singular knob; however, display 20 is displaying and processing circuit 22 is registering two different sensitive control regions 21 within the same "knob." When a user approaches the "control knob," light is reflected onto both regions 21, but because of the desire to slide the knob, one of the two regions will receive a larger amount. Under the control of processing circuit 22 (e.g. software running on a microprocessor of processing circuit 22), the control knob can be configured to not slide as long as the two control regions 21 of the knob are receiving roughly equal amounts of reflected light. Thus, the knob may be configured to follow the movement of the finger.

If processing circuit 22 includes a microprocessor, the interior of the vehicle or its design may be determined by software. This software may be updated over time. Also, a user may be allowed to personalize the functions and/or the appearance of the display 20 and/or dashboard of a vehicle. Further, a manufacturer may be able to use a single system to achieve different styles in different vehicle models. The control buttons and functions could also be available and/or reconfigurable over a home network, the Internet, etc.

An exemplary system includes a display as discussed above, wireless headphones (e.g. headphones using light, such as infrared light, or other electromagnetic radiation to wirelessly receive audio data), and/or a wireless remote control (e.g. a wireless remote control configured to use light, such as infrared light, or other electromagnetic radiation to transmit control signals). See, for example, FIGS. 20 and 24. The transmitters that transmit to the wireless headphones can both transmit the audio data (FM, AM, PSK, FSK, or ASK modulated data) to the wireless headphone and serve as the source of the characteristic of reflected light for identifying user actuations of control regions 21 displayed on the display 20. The receiver (e.g. sensor) used to receive commands from the wireless remote control can be configured to receive both the reflected light for identifying user actuation of control regions 21, and the signals transmitted by the remote control. The processing circuit 22 may be configured to receive data from the receiver (e.g. sensor), process the receiver information to derive data representative of a control region 21 to be actuated (e.g. using any of the techniques disclosed above), identify whether control regions 21 of a display 20 have been actuated (e.g. using any of the techniques described above), identify data as received from the remote control, provide the remote control data and/or the control region 21 data to another system, and/or execute the commands contained in the data from the remote control or indicated by the control region 21 actuated. In some embodiments, data processed by the processing circuit may be transmitted to another device for further processing (e.g. execution of commands).

Correction for Ambient Lighting

Referring to FIGS. 8 and 9, an arrangement for measuring reflected light may have a wide dynamic range and/or be insensitive to ambient light.

U.S. Pat. No. 5,666,037 describes a process that can react sensitively to light without responding to the conventional forms of interference such as ambient light. In this system, a second transmitting element, potentially emitting directly into the sensors 12,14 (e.g. a photodiode), is used during the transmission pauses of the outward-transmitting element to correct the power received by the photodiode in such a way that only a direct light signal without any clock-synchronizing signal components is present at the sensors 12,14. In this system, it is not the received signal that is measured; instead, the power of the second LED, which corresponds to power received by the sensors 12,14, is used to evaluate the signals.

Referring to FIG. 8, a diagram shows how the light signal received from the screen can be corrected by a light-emitting diode to form a "0" signal. Section A corresponds to a brightness signal with high luminous density, and section B to a signal of moderate luminous density. Section C corresponds to a moderate luminous intensity signal but at a much higher clock rate. Sections A, B, C do not have to be generated sequentially; it would also be possible to generate them in parallel.

Signal E shows first a signal of the type that would be present at the output of the photodiode amplifier without correction. D shows the synchronous demodulator clock signal, and F shows the correction value required to correct the signal in the photodiode to "0". The associated control power for the light-emitting diode is shown in G. Signal G is obtained only when there is a reflection from the screen or from a finger. The output signal of the photodiode amplifier possibly contains only the noise of the diode and of the amplifier and no synchronizing clock components. This is shown as signal H.

Referring to FIG. 9, a block diagram of the circuit of FIG. 8 for correcting a sensor includes a photodiode 12 that detects the signal reflected from the finger 270. This photodiode 12 can be located behind or next to the screen 102, but in any case it must be able to receive the signal 268 reflected from the finger 270. The amplified signal is sent via the preamp 202 to the synchronous demodulator 204, which breaks the photodiode signal down again into its two components, namely, the projection power and LED power. These are compared in the comparator 204*b*. If there is a difference between the two values, the power of the LED 206 is adjusted until the signal received by the photodiode 12 no longer contains any synchronizing clock components. The control signal is tapped at 208 for further processing. A clock circuit 210 drives the LED power control unit 212, the synchronous demodulator, and the projector control unit 214.

In the projector control unit 214, the image data 216 are linked with the keypad data 218 so that the projector can be actuated accordingly.

A circuit design of this type can provide high sensitivity, which means that the photodiode 12 may be installed near the projector 104. Instead of the one light source (LED 206), it would also be possible, of course, to connect multiple light sources such as two or three light sources (LEDs) emitting the similar (e.g. the same) colors as those of the projector 104 (e.g. R, G, B) in synchrony with the color transmission of the projector 104 in such a way that each individual color can be compensated with its own wavelength. Particularly in embodiments where the sensor 12 is covered in such a way that ambient lighting is reduced, a single light source 206 (e.g. an LED with the color "white") may be sufficient.

A sensor 12 (e.g. photodiode 206) that is positioned near the projector may also pick up light sent from the projector 104 to the screen 102. This may be seen by sensor 12 (FIG. 1) with an intensity that is many times greater than that of the light 268 reflected by a finger 270. However, this is a static value; a dynamic change occurs when the reflection changes (e.g., when a hand 270 approaches the screen 102). Dynamic value changes equivalent to one-thousandth of the static reflection may be detected without being affected by ambient light by means of, for example, the process known as "Halios" (High Ambient Light Independent Optical System) (See U.S. Pat. No. 5,666,037 and PCT application WO 95/01561).

Measuring and/or Displaying Shadows

In some embodiments, sensors 12,14 and/or processing circuit 22 may be configured to measure the direction from which sunlight/ambient light is falling on the vehicle (particularly on display 20). Sensors 12,14 may be arranged such that they can be used to determine the direction in which the incident light is falling on the display surface 102.

Figure 13:
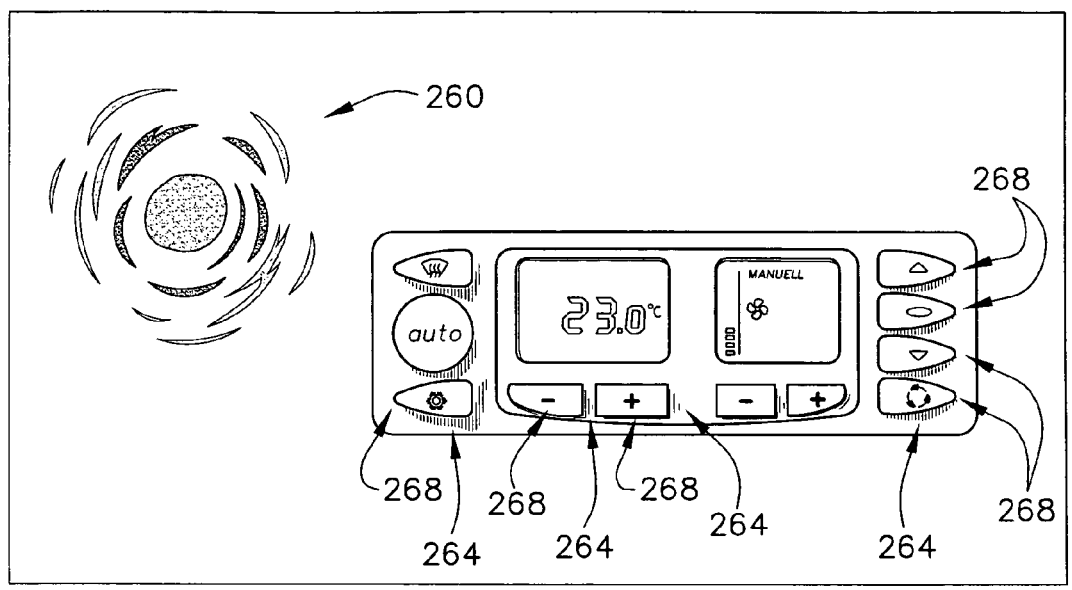
FIGS. 13 and 14 an illustration of creating changeable artificial shadows according to one embodiment.
Figure 14:
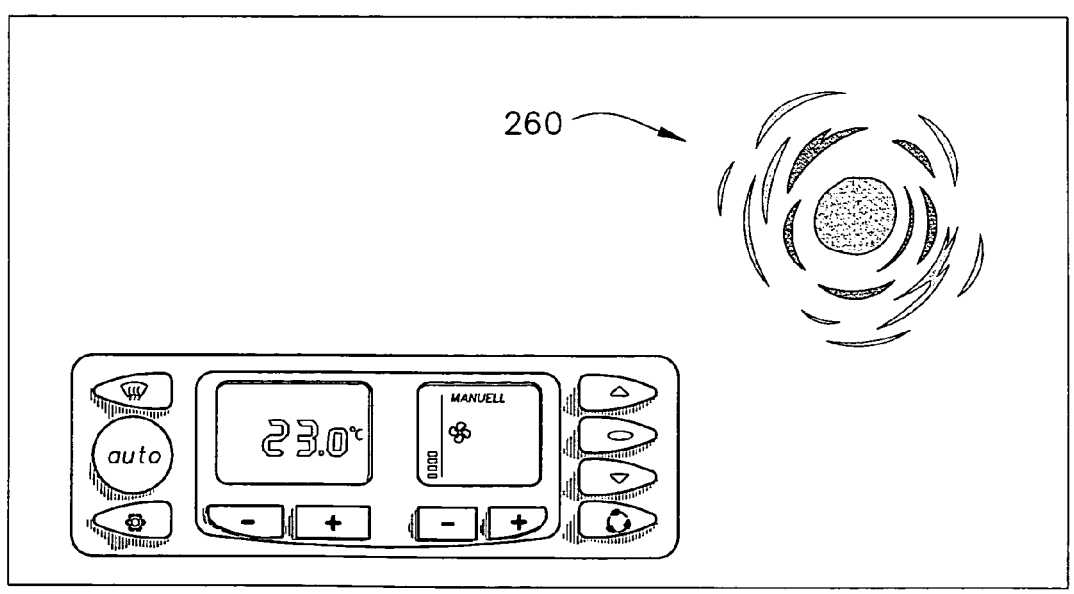

Based on a determination of the direction from which the ambient light is shining, processing circuit 22 can be configured to create a shadowing effect. As shown in FIG. 13, ambient (sun) light 260 is coming from the left so processing circuit 22 (FIG. 1) causes artificial shadows 264 to be displayed down and to the right of display elements 268. As shown in FIG. 14, as the direction of the ambient light 260 changes (e.g. as a vehicle changes direction, as the direction of light sources change, as the time of day changes, etc.) the direction of artificial shadows 264 may change.

The light sensors 12,14 used to measure direction and intensity of ambient light can be located around and at a slight angle to screen 102 (FIG. 4). The sensors 12,14 can be used simultaneously as receivers for the display control system 10, described above. The sensors 12,14 configured to gather information relating to the direction and intensity of the ambient light could also be installed behind the screen.

By creating artificial shadows, a more realistic 3D feel can be imparted to display 20 in some embodiments that implement the artificial shadows.

If complete accuracy is not as important, a similar artificial shadowing effect may be achieved by combining information from a compass system (or other direction information providing system such as a GPS system) and time/date information.

Display Systems

Processing circuit 22 may be configured to send control data to other vehicle systems 28 in response to receiving a user command entered by actuating a control region 21. The other vehicle system 28 may include a GPS system, an HVAC system, an entertainment system, a trip computer, an audio system, a camera system, a phone system, a compass system, an e-mail system, a vehicle lighting system, and/or some other vehicle system. Processing circuit 22 may also be configured to receive data from these other vehicle systems 28 (e.g. data to display, possible control regions to display, etc.). Other vehicle system 28 and processing circuit 22 may be entirely separate, may share some components, may be essentially integral, or may maintain another relationship.

Display 20 may be configured to display information (controls, data, etc.) for various systems. This information may include GPS information, HVAC information, entertainment information which includes rear seat entertainment controls, trip computer information, audio system information including radio information such as satellite radio information, camera information which may include rear-seat camera information and may include back-up camera information, may include phone system information, may include compass information, may include e-mail information, may include task information, may include CD information, may include electronic music (e.g. MP3 player) information, may include vehicle lighting information, and/or may include any number of other types of information. It is contemplated that display 20 may be configured to display one, two, multiple, or none of the possible combinations of these types of information.

EXAMPLES

Example 1

Figure 10:
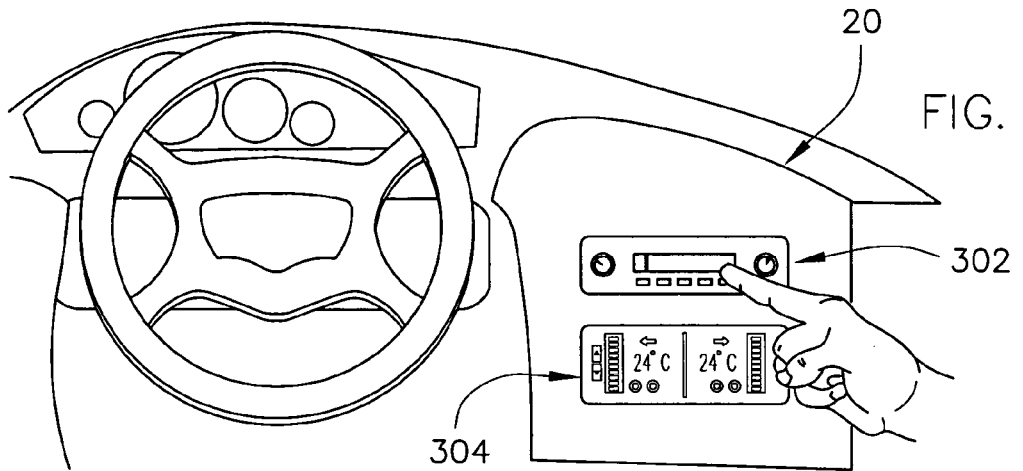
FIGS. 10-12 are directed to changeable display systems according to various embodiments.

As an exemplary implementation of a change in a control region based on a determination that a user may be approaching the control region 21, a volume control might enlarge or change its graphical representation based on a determination that a user has approached the volume control. As shown in FIG. 10, a volume control 302 is an original first size when operating in normal conditions.

Figure 11:
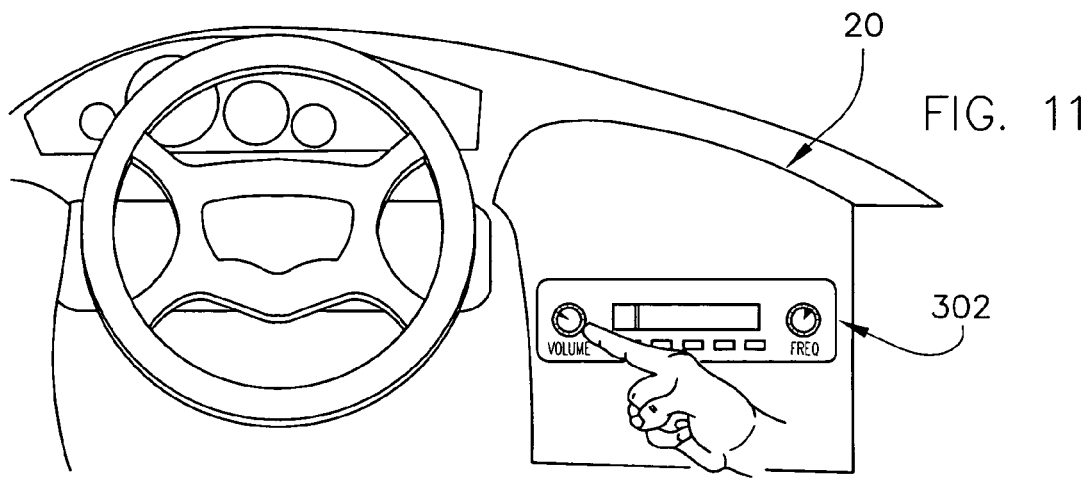

As shown in FIG. 11, when a finger approaches the volume control region 302, processing circuit 22 may be configured to expand this control region 302 to fill the entire screen.

Figure 12:
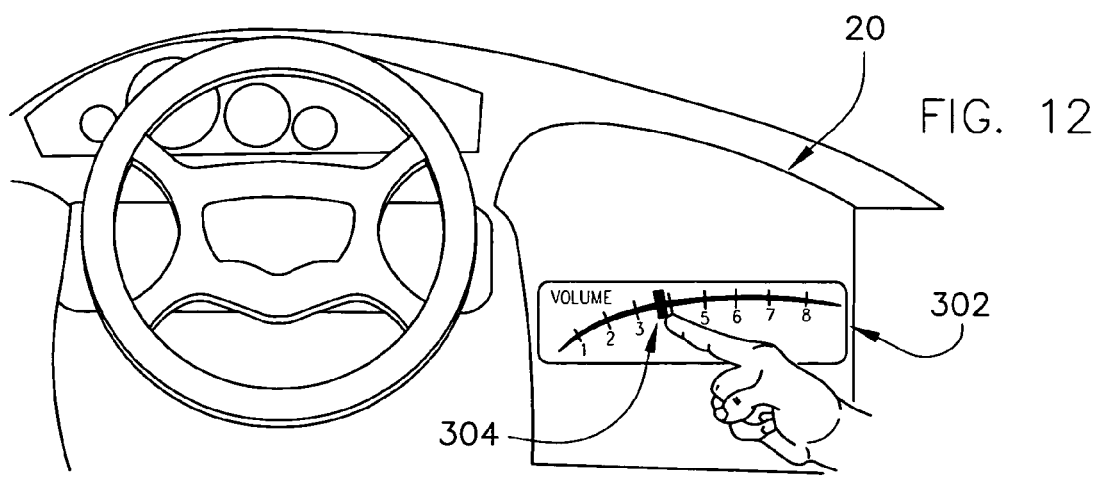

As shown in FIG. 12, when a user's finger approaches control region 302, processing circuit 22 (FIG. 1) is configured to transform this volume control region 302 by enlarging the control region 302 and by changing the graphical representation of the volume control region 302. Processing circuit 302 transforms volume control region 302 into a large slide controller.

The brightness of the individual pixels can be adjusted by varying the pulse-pause ratios while the frequency in the area of the control region remains the same. Both completely black and completely white pixels can also be generated when surfaces of moderate brightness are located in their immediate vicinity. Thus it is possible to make a graphic display into an interactive surface.

Example 2

Figure 15:
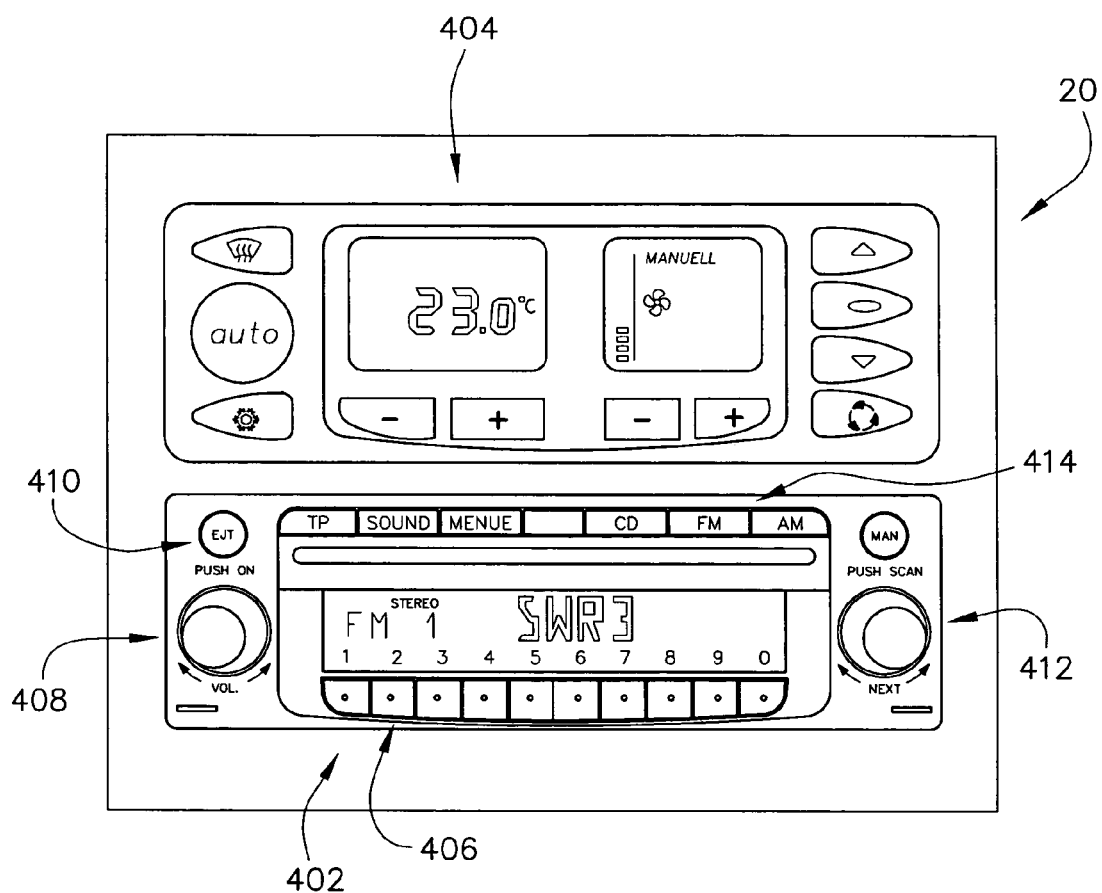
FIG. 15 is a display system according to one embodiment.

Referring to FIG. 15, one exemplary display 20 is illustrated. The dashboard of a vehicle in which display 20 is installed may have a smooth, curved surface with few or no mechanical control elements. Typical functions such as the radio 402, air-conditioner 404, etc., may be projected as images onto the graphic surface 102 (FIG. 4) of display 20 under control of a processing circuit 22 (FIG. 1). The images 402,404 may be photorealistic with interactive/movable shadows.

If a user wants to operate a radio 28 (FIG. 1) of the vehicle, the display 20 in the vehicle shows several functions 406-414 similar to standard radio controls. The images 406-414 may have the appearance of menu blocks, or, as shown in FIG. 15, may have the appearance of physical controls such as knobs, buttons, etc.

As a user approaches the radio control area 402 of the display 20 (e.g. by the time the user is within 50 or 30 mm of display screen 102), processing circuit 22 (FIG. 1) may be configured to enlarge the radio control region 402, and may be configured to hide the non-radio control region (e.g. HVAC controls 404).

When approached, the standard volume knob 408 may be changed into a linear controller that occupies a larger area (see, e.g., FIGS. 10-12). A larger control area may make it easier to operate the volume control region 408 in less than ideal conditions, such as on bumpy roads.

With reference to FIG. 12, users may "move" the slider 304 by moving their hand to adjust the volume and thus increase or decrease the volume to the desired level.

It is also possible that the linear controller 304 could appear in the upper part of the screen, while underneath a view of the passenger compartment of the vehicle appears with a circle to indicate the setting selected for the acoustic balance within the vehicle. By "grabbing" and moving the balance circle, the user can then adjust the position of the acoustic center point in space.

After making the desired changes and pulling his hand away (e.g. to at least 50, 100 or 150 mm from the display screen 102) the display 20 may revert to its original condition.

Illustrative Embodiments

One embodiment is directed to a control system. The control system includes a display configured to display information to a user, the displayed information including a control region, a point light sensor configured to receive light as it is reflected by an object approaching the control region and to output data in response to the received light, and a processing circuit configured to receive the data output from the light sensor and to process the received data to determine whether the control region has been actuated.

Another embodiment is directed to a control system. The control system includes a display configured to display information to a user, the displayed information including a control region, a light sensor configured to receive light as it is reflected by an object approaching the control region and to output data in response to the received light, a light guide configured to guide light reflected from the display to the light sensor, and a processing circuit configured to receive the data output from the light sensor and to process the received data to determine whether the control region has been actuated.

Another embodiment is directed to a control system. The control system includes a display configured to display information to a user, the displayed information including a control region, a light sensor located in front of the graphic surface of the display and configured to receive light as it is reflected by an object approaching the control region and to output data in response to the received light, and a processing circuit configured to receive the data output from the light sensor and to process the received data to determine whether the control region has been actuated.

Another embodiment is directed to a control system. The control system includes a display configured to display information to a user, the displayed information including a control region that is configured to be displayed at a different frequency than other portions of the displayed information, a light sensor configured to receive light as it is reflected by an object approaching the control region and to output data in response to the received light, and a processing circuit configured to receive the data output from the light sensor and to process the received data to determine whether the control region has been actuated.

Another embodiment is directed to a control system. The system includes a display configured to display information to a user, the displayed information including a control region, a light sensor configured to receive light as it is reflected by an object approaching the control region and to output data in response to the received light, and a processing circuit configured to receive the data output from the light sensor and to process the received data to determine whether the control region has been actuated based on a characteristic of the light received.

In some of these embodiments, the characteristic may be a frequency at which the light is modulated.

In some of these embodiments, the characteristic is a time at which the light is received by the sensor. The display may be configured to display different portions of the displayed information at different times. The processing circuit may be configured to receive timing data indicative of a time at which the control region was displayed by the display. The processing circuit may be configured to determine whether the control region has been actuated based on the time at which the light was received by the sensor, and the timing data indicative of the time at which the control region was displayed.

In some of these embodiments, the characteristic may include an amplitude of the light.

Another embodiment is directed to a control system. The control system includes a panel display configured to display information to a user, the displayed information including a control region; a light sensor configured to receive light as it is reflected by an object approaching the control region and to output data in response to the received light; and a processing circuit configured to receive the data output from the light sensor and to process the received data to determine whether the control region has been actuated.

Another embodiment is directed to a control system. The control system includes a display configured to display information to a user, the displayed information including a plurality of control regions that are differentiated from each other based on a characteristic, and a processing circuit configured to determine which control region has been actuated based on the characteristic that differentiates each control region. The characteristic includes at least one of a frequency of light displaying each control region, a phase of light displaying each control region, an amplitude of light displaying each control region, and timing of light displaying each control region.

Another embodiment is directed to a method for determining that a control region of a display has been actuated. The method comprises displaying a control region having a predetermined characteristic, receiving data based on reflections as a user approaches the control region, measuring the received data for the predetermined characteristic, analyzing the measurement to determine whether the control region has been actuated.

Another embodiment is directed to a control system. The control system includes a display configured to display information to a user, the displayed information including a control region, a light sensor configured to receive light as it is reflected by a finger approaching the control region while the finger is an inch away from a display surface of the display, and to output data in response to the received light, and a processing circuit configured to receive the data output from the light sensor and to process the received data to determine whether the control region has been actuated.

Another embodiment is directed to a control system. The system includes a display configured to display information to a user, the displayed information including a control region; a light sensor system configured to receive light as it is reflected by an object approaching the control region and to output data in response to the received light, the light sensor system capable of receiving light that has been scattered in substantially opposite directions, and a processing circuit configured to receive the data output from the light sensor and to process the received data to determine whether the control region has been actuated.

Another embodiment is directed to a control system. The control system includes a display configured to display information to a user. The displayed information includes a control region. The control system also includes at least two light sensors configured to receive light as it is reflected by an object approaching the control region and to output data in response to the received light, and a processing circuit that receives the data output from the light sensors, and processes the received data to determine whether the control region has been actuated.

Another embodiment is directed to a control system. The control system includes a display configured to display information to a user. The displayed information includes a control region. The system also includes a light sensor configured to receive light as it is reflected by an object approaching the control region and to output data in response to the received light. The light sensor is not a machine vision sensor. The system also includes a processing circuit that receives the data output from the light sensor and processes the received data to determine whether the control region has been actuated.

Another embodiment is directed to a control system. The control system includes a display configured to display information to a user. The displayed information includes a control region. The system also includes a light sensor configured to receive light as it is reflected by an object approaching the control region and to output data in response to the received light. The light sensor is not a camera. The system also includes a processing circuit that receives the data output from the light sensor and processes the received data to determine whether the control region has been actuated.

Another embodiment is direct to a display system. The display system includes a display configured to display information to a user, and a processing circuit configured to receive the data indicative of an angle of incident light and configured to control display of moving artificial shadows based on the data.

Another embodiment is directed to a vehicle control system. The system includes a light sensor configured to receive light as it is reflected by an object, a projector-based display configured to display information to a user, and a processing circuit coupled to the light sensor. The displayed information includes a control region. The projector based display includes a mirror configured to reflect light to a display surface to form a pixel of the displayed information, and is also configured to reflect light to the light sensor. The processing circuit is configured to receive the data output from the light sensor, and to control at least one vehicle system based on the data received from the light sensor.

In any of the above-mentioned embodiments, the display may include reconfigurable controls. The reconfigurable controls may be two dimensionally represented controls. The reconfigurable controls may be tactile controls. The tactile controls may be include at least one of a button, a slider, and a knob. The light sensor may be configured to detect light from the reconfigurable display that is reflected by an object.

In any of the above-mentioned embodiments, the display may be mounted in a vehicle and may be configured to display information from at least one other vehicle system. In some embodiments, the other vehicle system may include at least one of a GPS system, an HVAC system, an entertainment system, a trip computer, an audio system, a camera system, a phone system, a compass system, an e-mail system, and a vehicle lighting system. The at least one other vehicle system may include a multiplicity of systems including at least two of those mentioned above.

In any of the above-mentioned embodiments, the processing circuit may be configured to determine that the control region has been actuated only after a series of determinations based on received data consistently indicate that the control region has been actuated.

In any of the above-mentioned embodiments, a display surface of the display may be non-flat.

In any of the above-mentioned embodiments, the system may further include a controllable light source separate from the display that is configured to provide light to the light sensor. The controllable light source may be configured to aid in correcting effects of ambient light on the sensor. The system may include two or more such light sources configured to provide light to the display. The controllable light sources may have colors similar to colors of the display.

In any of the above-mentioned embodiments, the display may include a projector configured to project an image onto a display surface.

In any of the above-mentioned embodiments, the processing circuit may be configured such that it can determine that a control region has been actuated without a user touching a display surface of the display.

In any of the above-mentioned embodiments, the display may be configured such that a control region can change based on a determination that an object is approaching the control region.

In any of the above-mentioned embodiments, the light sensor may be configured to gather data representative of an angle of ambient light.

In any of the above-mentioned embodiments, the processing circuit may be configured to receive data indicative of an angle of incident light. The processing circuit may be configured to display moving artificial shadows on the display based on the angle of incident light.

One embodiment is directed to a control system. The control system includes a display configured to display information to a user. The displayed information includes at least one control region. The system also includes a point light sensor configured to receive light as it is reflected by an object approaching the one or more control regions and to output data in response to the received light, and a processing circuit configured to receive the data output from the light sensor and to process the received data to determine whether the control region has been actuated.

Another embodiment is directed to a control system. The control system includes a display configured to display information to a user. The displayed information includes a control region. The system also includes a light sensor configured to receive light as it is reflected by an object approaching the control region and to output data in response to the received light, a light guide configured to guide light reflected from the display to the light sensor, and a processing circuit configured to receive the data output from the light sensor and to process the received data to determine whether the control region has been actuated.

Another embodiment is directed to a control system. The control system includes a display configured to display information to a user. The displayed information includes a control region. The system also includes a light sensor located in front of the graphic surface of the display and configured to receive light as it is reflected by an object approaching the control region and to output data in response to the received light, and a processing circuit configured to receive the data output from the light sensor and to process the received data to determine whether a control region has been actuated.

Another embodiment is directed to a control system. The control system includes a display configured to display information to a user. The displayed information includes a control region that is configured to be displayed using light that is modulated at a different frequency than other portions of the displayed information. The system also includes a light sensor configured to receive light as it is reflected by an object approaching the control region and to output data in response to the received light, and a processing circuit configured to receive the data output from the light sensor and to process the received data to determine whether the control region has been actuated.

Another embodiment is directed to a control system. The control system includes a display configured to display information to a user. The displayed information includes a control region. The system also includes a light sensor configured to receive light as it is reflected by an object approaching the control region and to output data in response to the received light, and a processing circuit configured to receive the data output from the light sensor and to process the received data to determine whether the control region has been actuated based on a characteristic of the light received.

In some of these embodiments, the characteristic may be a frequency at which the light is modulated.

In some of these embodiments, the characteristic is a time at which the light is received by the sensor. The display may be configured to display different portions of the displayed information at different times. The processing circuit may be configured to receive timing data indicative of a time at which the control region was displayed by the display. The processing circuit may be configured to determine whether the control region has been actuated based on the time at which the light was received by the sensor, and the timing data indicative of the time at which the control region was displayed.

In some of these embodiments, the characteristic may include an amplitude of some portion of and/or all of the light.

Another embodiment is directed to a control system. The control system includes a display configured to display information to a user. The displayed information includes a control region. The system also includes a light sensor configured to receive light as it is reflected by an object approaching the control region and to output data in response to the received light; and a processing circuit configured to receive the data output from the light sensor and to process the received data to determine whether the control region has been actuated.

Another embodiment is directed to a control system. The control system includes a display configured to display information to a user. The displayed information includes a plurality of control regions that are differentiated from each other based on a characteristic. The system also includes a processing circuit configured to determine which control region has been actuated based on the characteristic that differentiates each control region. The characteristic may include one or more of a modulated frequency of light displaying each control region, a phase of light displaying each control region, an amplitude of light displaying each control region, a color of each control region, and timing of light displaying each control region.

Another embodiment is directed to a method for determining that a control region of a display has been actuated. The method comprises displaying a control region having a predetermined characteristic, receiving data based on reflections as a user approaches the control region, measuring the received data for the predetermined characteristic, analyzing the measurement to determine whether the control region has been actuated.

Another embodiment is directed to a control system. The control system includes a display configured to display information to a user. The displayed information includes a control region. The system also includes a light sensor configured to receive light as it is reflected by a finger approaching the control region (e.g. where the finger is an inch away from a display surface of the display), and to output data in response to the received light. The system further includes a processing circuit configured to receive the data output from the light sensor and to process the received data to determine whether the control region has been actuated.

Another embodiment is directed to a control system. The control system includes a display configured to display information to a user. The displayed information includes a control region. The system also includes a light sensor system configured to receive light as it is reflected by an object approaching the control region and to output data in response to the received light, and a processing circuit configured to receive the data output from the light sensor and to process the received data to determine whether the control region has been actuated. The light sensor system is capable of receiving light that has been scattered in substantially opposite directions.

Another embodiment is directed to a vehicle control system. The system includes a light sensor configured to receive light as it is reflected by an object, a projector-based display configured to display information to a user, and a processing circuit coupled to the light sensor. The displayed information includes a control region. The projector based display may include a mirror configured to reflect light to a display surface to form a pixel of the displayed information, and is also configured to reflect light to the light sensor. The processing circuit is configured to receive the data output from the light sensor, and to control at least one vehicle system based on the data received from the light sensor. The projector based display may also include one or more of an LCD display, a LASER scanning device, etc.

Another embodiment is direct to a display system. The display system includes a display configured to display information to a user, and a processing circuit configured to receive the data indicative of an angle of incident light and configured to control display of moving artificial shadows based on the data.

Another embodiment is directed to a control system. The control system includes a display configured to display information to a user. The displayed information includes a control region. The control system also includes at least two light sensors configured to receive light as it is reflected by an object approaching the control region and to output data in response to the received light, and a processing circuit that receives the data output from the light sensors, and processes the received data to determine whether the control region has been actuated.

Another embodiment is directed to a control system. The control system includes a display configured to display information to a user. The displayed information includes a control region. The system also includes a light sensor configured to receive light as it is reflected by an object approaching the control region and to output data in response to the received light. The light sensor is not a machine vision sensor. The system also includes a processing circuit that receives the data output from the light sensor and processes the received data to determine whether the control region has been actuated.

Another embodiment is directed to a control system. The control system includes a display configured to display information to a user. The displayed information includes a control region. The system also includes a light sensor configured to receive light as it is reflected by an object approaching the control region and to output data in response to the received light. The light sensor is not a camera. The system also includes a processing circuit that receives the data output from the light sensor and processes the received data to determine whether the control region has been actuated.

Another embodiment is directed to a control system. The control system includes a display configured to display information to a user. The displayed information includes a control region. The display includes a backlight that can be modulated. The system also includes a light sensor configured to receive the modulated light as it is reflected by an object approaching the control region and to output data in response to the received light. The system also includes a processing circuit that receives the data output from the light sensor and processes the received data to determine whether the control region has been actuated.

Another embodiment is directed to a control system. The control system includes a display configured to display information to a user. The displayed information includes a plurality of control regions. The display includes a backlight that can be modulated. The system also includes a light sensor configured to receive the modulated light as it is reflected by an object approaching a control region and to output data in response to the received light. The system also includes a processing circuit that receives the data output from the light sensor and processes the received data to determine whether a control region has been actuated.

Another embodiment is directed to a control system. The control system includes a display configured to display information to a user. The displayed information includes a control region. The display includes a backlight that can be modulated. The system also includes at least two light sensors configured to receive the modulated light as it is reflected by an object approaching the control region and to output data in response to the received light. The system also includes a processing circuit that receives the data output from the light sensors and processes the received data to determine whether the control region has been actuated.

Another embodiment is directed to a control system. The control system includes a display configured to display information to a user. The displayed information includes a control region. The system includes a remote control that utilizes light to transmit information. The system also includes a light sensor configured to receive the light as it is reflected by an object approaching the control region or transmitted by the remote control and to output data in response to the received light. The system also includes a processing circuit that receives the data output from the light sensor and processes the received data to determine whether the control region has been actuated or transmits the received data to another processing circuit.

Another embodiment is directed to a control system. The control system includes a display configured to display information to a user. The displayed information includes a control region. The system includes an audio transmission system that utilizes light to transmit information. The system also includes a light sensor configured to receive the light as it is reflected by an object approaching the control region and to output data in response to the received light. The system further includes a processing circuit that receives the data output from the light sensor and processes the received data to determine whether the control region has been actuated.

Many embodiments can be used with, in addition to standard displays, displays whose display surface is not flat.

Other features may be gleaned from the disclosure, including the examples and Summary. Some embodiments will be combinations of any of the embodiments discussed above with each other (and all such possible combinations are contemplated) and/or with any of the additional features discussed herein.

The various features of the illustrative embodiments are a list of some, although not all, potential embodiments evident in the description. The various features described above in the detailed description and illustrative embodiments can be used in any combination with other features from other parts of the description and illustrative embodiments. Each such possible combination is contemplated.

While illustrated in a vehicle as one exemplary implementation, the systems described above can also be applied in non-vehicle systems. For example, the display and control systems discussed above could be used as inputs to a touch screen device of a computer, including hand-held computing devices. As another example, the display and control systems could be used in a kiosk with reconfigurable controls. While other vehicle systems 28 are illustrated in FIG. 1, it is evident that in non-vehicle systems the "other systems" would be other non-display systems such as memory holding information to be displayed, a central server (e.g. in a banking application), etc.

Also, while much of the discussion has been directed to light, similar principles can be directed to systems that provide a form of radiation (e.g. electromagnetic radiation) other than light that can be reflected by a user and/or by an object used by the user to input commands.

It is also possible to use an arrangement similar to that described in the embodiments above that does not use light as the means of differentiation for the control regions.

What is claimed is:

1. A control system comprising:
a display configured to display information to a user, the displayed information including a control region and a non-control region;
a light sensor configured to receive light as it is reflected by an object approaching the control region or the non-control region and to output a signal in response to the received light; and
a processing circuit configured to
receive a signal based on the signal output from the light sensor,
differentiate between the control region and the non-control region,
determine whether the object is approaching the control region or the non-control region,
process the received signal to determine whether the control region has been actuated based on a characteristic of the light received by the light sensor, and
record a time at which the light sensor receives the reflected light and compare the recorded time to a time at which pixels corresponding to the control region are illuminated.

2. The control system of claim 1, wherein the display is configured to provide the light containing the characteristic.

3. The control system of claim 2, wherein the display is configured to provide light containing the characteristic to contain a set of one or more characteristics unique to a specific control region displayed by the display.

4. The control system of claim 2, wherein the light containing the characteristic is configured to be provided by a light source used to illuminate areas in addition to the control region such that the light containing the characteristic can be reflected by an object approaching a region of the display other than the control region.

5. The control system of claim 1, wherein the system is configured such that light containing the characteristic is provided from behind a display surface of the display.

6. The control system of claim 1, wherein the characteristic of light corresponds to a location on a display surface of the display from which the light was provided.

7. The control system of claim 1, wherein,
the control system further comprises a light source;
the light source is configured to provide a light which can be reflected by a user approaching a control region to actuate the control region;
the light sensor is configured to receive the light reflected from the light source and to provide an output signal based on the reflected light from the light source received by the light sensor;
the processing circuit is configured to determine whether the control region has been actuated based on the signal output from the light sensor in response to the reflected light from the light source received by the processing circuit; and
the light source is configured to provide a data output configured to wirelessly provide data to a system that is remote from the light source.

8. The control system of claim 7, wherein the light source is configured to provide an output carrying an audio signal.

9. The control system of claim 1, wherein the display is configured to modulate light at different frequencies, and the processing circuit is configured to determine which control region has been actuated based on the frequency at which the received light has been modulated.

10. The control system of claim 1, wherein a plurality of backlights of the display are configured to provide light containing different characteristics, and wherein the processing circuit is configured to determine whether the control region has been actuated based on the different characteristics of the light received.

11. The control system of claim 1, wherein the light sensor is further configured to receive a signal from a remote control and is configured to provide an output signal based on the signal from the remote control such that commands transmitted by the remote control can be executed.

12. The control system of claim 1, further comprising a light guide configured to guide light to the light sensor.

13. The control system of claim 12, wherein the light guide is configured to be located at least in front of the display surface of the display.

14. The control system of claim 13, wherein the light sensor is configured to be located behind the display surface of the display.

15. The control system of claim 12, wherein the light guide is configured to be located to at least one side of a display surface of the display.

16. The control system of claim 12, wherein the light guide is configured to be located around multiple sides of the display surface of the display.

17. The control system of claim 12, wherein the light guide is further configured to guide light used to illuminate the display.

18. The control system of claim 1, wherein,
the light sensor is a first light sensor;
the control system further comprises a second light sensor separate from the first light sensor, the second light sensor configured to receive light as it is reflected by an object approaching the control region and to output a signal in response to the received light; and
the processing circuit is further configured to receive a signal based on the signal output from the second light sensor and to process the received signal based on the signal output from the second light sensor to determine whether the control region has been actuated.

19. The control system of claim 18, wherein the first light sensor and second light sensor are configured such that they can both receive light reflected from a common light source.

20. The control system of claim 1, wherein the light sensor is a sensor comprising no more than 25 pixels.

21. The control system of claim 20, wherein the light sensor is a point light sensor.

22. The control system of claim 1, wherein the system is configured such that light received by the light sensor is collected from in front of a display surface of the display.

23. The control system of claim 1, wherein the control region to be actuated can be identified without touching the display.

24. The control system of claim 1, wherein the system is configured to detect light that has been reflected in multiple directions.

25. The control system of claim 24, wherein the multiple directions include at least two directions that are substantially opposite directions with respect to a display surface of the display.

26. The control system of claim 24, wherein the light sensor is configured to receive the light reflected in multiple directions.

27. The control system of claim 1, wherein the display comprises a curved display surface.

28. The control system of claim 1, wherein processing of the received signal by the processing circuit comprises processing data based on the signal received from the light sensor.

29. The control system of claim 28, wherein the processing circuit is configured to receive the data based on the signal output from the light sensor from a vehicle bus.

30. The control system of claim 1, wherein the processing circuit is directly connected to the light sensor such that the output signal that is output by the light sensor is the same as the received signal that is received by the processing circuit based on the output signal.

31. The control system of claim 1, wherein the display comprises an LCD display.

32. The control system of claim 1, wherein the processing circuit comprises an IC containing the light sensor.

33. The control system of claim 1, wherein the processing circuit is configured to:
    differentiate between the control region and the non-control region based on a color associated with each of the control region and the non-control region, and
    determine, based on the color associated with each of the control region and the non-control region, whether the object is approaching the control region or the non-control region.

34. A control system comprising:
    a display configured to display information to a user, the displayed information including a control region and a non-control region;
    a light sensor configured to receive light as it is reflected by an object approaching the control region or the non-control region and to provide an output signal in response to the received light; and
    a processing circuit configured to
        receive data based on the signal output from the light sensor in response to the received light,
        differentiate between the control region and the non-control region,
        determine whether the object is approaching the control region or the non-control region,
        process the received signal to determine whether the control region has been actuated; and
        record a time at which the light sensor receives the reflected light and compare the recorded time to a time at which pixels corresponding to the control region are illuminated;
    wherein the light sensor is further configured to receive a signal from a remote control and is configured to provide an output signal based on the signal from the remote control such that commands transmitted by the remote control can be executed.

35. The control system of claim 34, wherein,
    the control system further comprises a light source;
    the light source is configured to provide a light which can be reflected by a user approaching a control region to actuate the control region;
    the light sensor is configured to receive the light reflected from the light source and to provide an output signal based on the reflected light from the light source received by the light sensor;
    the processing circuit is configured to determine whether the control region has been actuated based on the signal output from the light sensor in response to the reflected light from the light source received by the processing circuit; and
    the light source is configured to provide a data output configured to wirelessly provide data to a system that is remote from the light source.

36. The control system of claim 34, wherein the processing circuit is configured to:
    differentiate between the control region and the non-control region based on a color associated with each of the control region and the non-control region, and
    determine, based on the color associated with each of the control region and the non-control region, whether the object is approaching the control region or the non-control region.

37. A control system comprising:
    a display configured to display information to a user, the displayed information including a control region and a non-control region;
    a light source;
    a light sensor configured to receive light from the light source as it is reflected by an object approaching the control region or the non-control region and to provide an output signal in response to the received light; and
    a processing circuit configured to
        differentiate between the control region and the non-control region,
        determine whether the object is approaching the control region or the non-control region,
        determine whether the control region has been actuated based on the signal output from the light sensor in response to the reflected light from the light source received by the light sensor; and
        record a time at which the light sensor receives the reflected light and compare the recorded time to a time at which pixels corresponding to the control region are illuminated;
    wherein the light source is further configured to provide a data output configured to wirelessly provide data to a system that is remote from the light source.

38. The control system of claim 37, wherein the light source is located behind a display surface of the display.

39. The control system of claim 37, wherein the control system comprises a plurality of light sources,
    wherein the light sensor is configured to receive light from any of the plurality of light sources.

40. The control system of claim 39, wherein the processing circuit is configured to determine whether the control region has been actuated based on one or more signals output from the light sensor in response to the reflected light from at least two of the plurality of light sources.

41. The control system of claim 37, wherein the data output by the light source comprises an audio signal.

42. The system of claim 37, wherein the display comprises reconfigurable controls.

43. The system of claim 37, wherein the display is mounted in a vehicle and is configured to display information from at least one other vehicle system.

44. The system of claim 37, wherein the processing circuit is configured to determine that the control region has been actuated only after a series of determinations based on received data consistently indicate that the control region has been actuated.

45. A display system comprising:
a display configured to display information to a user; and
a processing circuit configured to
    receive data indicative of an angle of incident light and create moving artificial shadows based on the data, and
    record a time at which a light sensor receives light reflected by an object approaching the display and compare the recorded time to a time at which pixels corresponding to a control region of the display are illuminated.

* * * * *